United States Patent
Starkey

[11] 3,803,466
[45] Apr. 9, 1974

[54] LINEAR MOTOR PROPULSION SYSTEM
[75] Inventor: Ronald C. Starkey, San Pedro, Calif.
[73] Assignee: Rockwell International Corporation, El Segundo, Calif.
[22] Filed: Feb. 28, 1972
[21] Appl. No.: 230,000

[52] U.S. Cl. ............ 318/135, 104/148 LM, 310/13, 318/38
[51] Int. Cl. .............................................. H02p 7/46
[58] Field of Search ........ 318/38, 135, 687; 310/12, 310/13, 14; 104/148 LM

[56] References Cited
UNITED STATES PATENTS

| | | | |
|---|---|---|---|
| 3,638,093 | 1/1972 | Ross | 318/135 X |
| 3,721,874 | 3/1973 | Pelenc | 318/135 |
| 3,407,749 | 10/1968 | Frig | 318/135 X |
| 3,513,338 | 5/1970 | Poloujadoff | 310/13 |
| 3,456,136 | 7/1969 | Pierro | 318/135 X |

OTHER PUBLICATIONS
Proc. of the Intersociety Energy Conversion Engnr. Conf., Sept. 22-26, 1969; Pgs. 795-806; Article by Chirgwin et al.

*Primary Examiner*—Gerald Goldberg
*Attorney, Agent, or Firm*—L. Lee Humphries

[57] ABSTRACT

A tracked vehicle propulsion system employs a plurality of linear synchronous motors, each having a thruster module, and all fixed in mutually spaced relation along a track. Trains of cars, mounted to ride along the track and each bearing a linear rotor having interdigitated magnetic poles, are propelled by successive thruster modules. Each thruster module is provided with a thruster control that is connected to establish interthruster logic and all modules are driven with three-phase stator drive signals from one or another of a group of thrust controllers. Velocity of this synchronous motor system is controlled open loop by direct control of stator drive signal frequency. Velocity changes are achieved by sweeping the stator frequency from synchronism with one frequency to synchronism with another frequency. The system operates a number of trains at a slow speed in a near bumper-to-bumper relation during a travel through a station and decelerates incoming trains for operation at station speed and position. Various methods of operation and control are provided, including, among others, a normal cyclic mode as the trains run from station to station and back, increasing or decreasing number of trains in service, manual or operator control of train movement, emergency stop, emergency start, and start for groups of trains.

61 Claims, 22 Drawing Figures

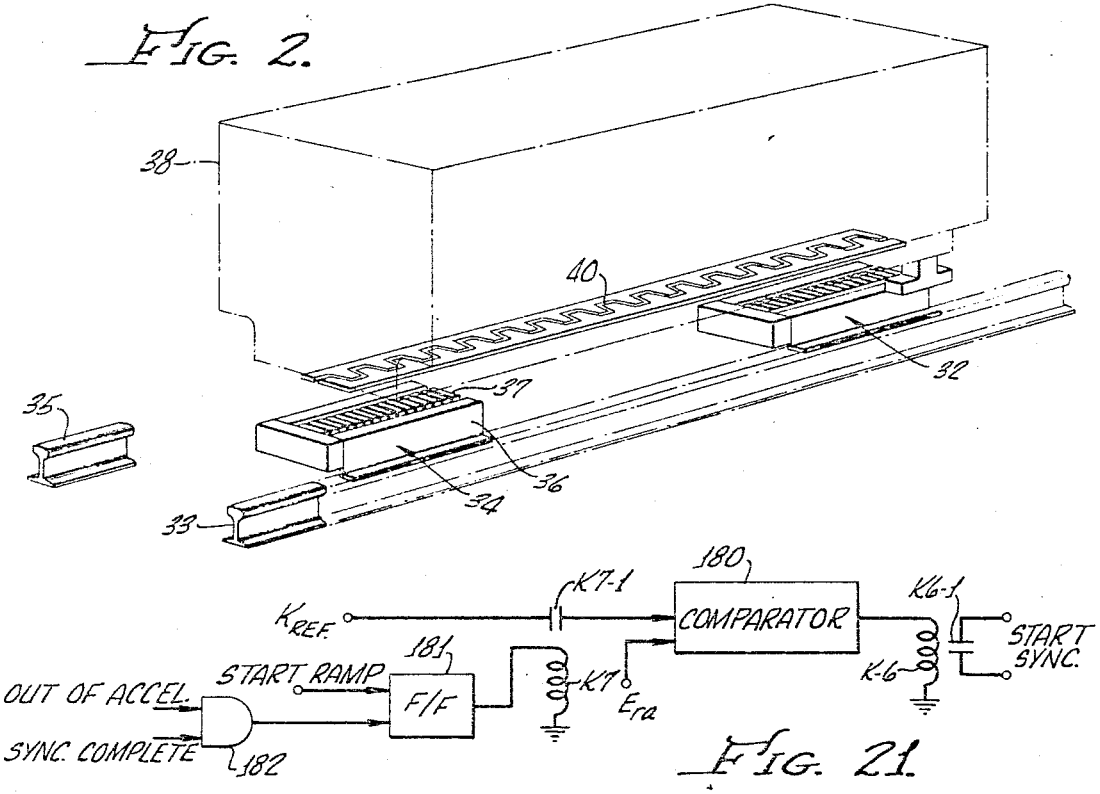
Fig. 2.
Fig. 21.
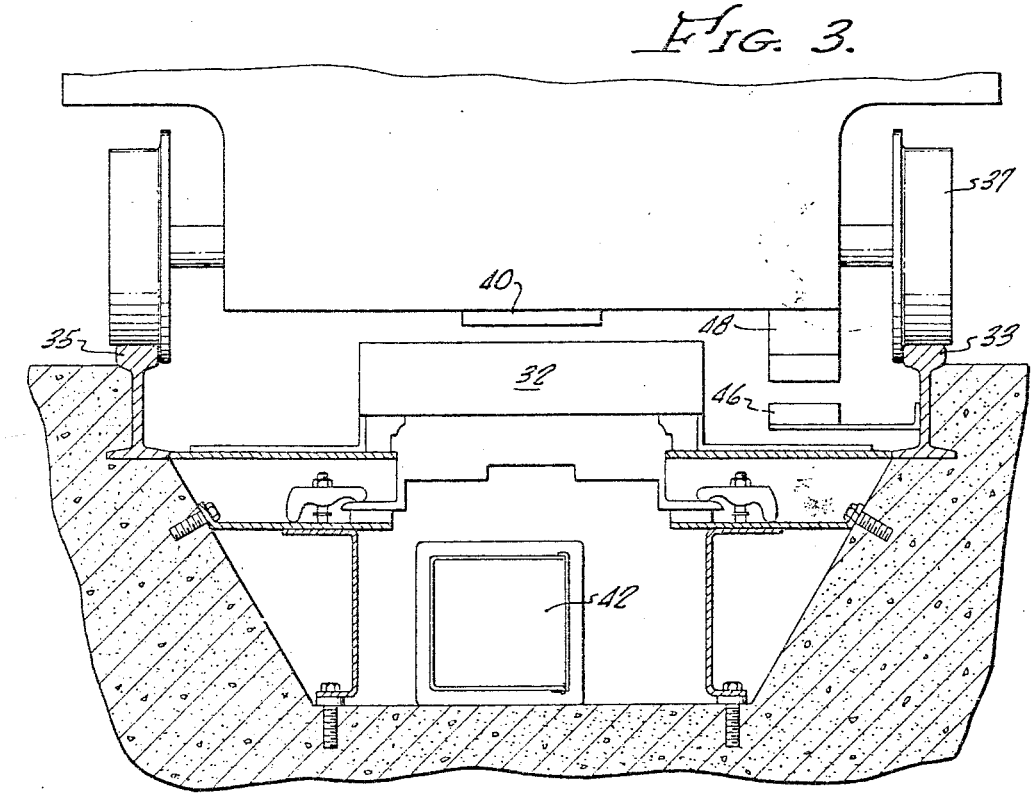
Fig. 3.

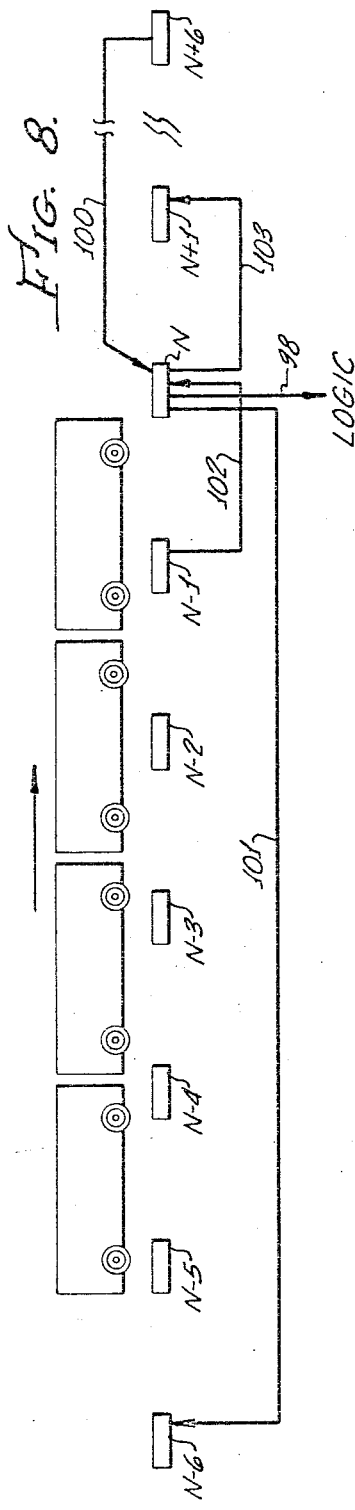
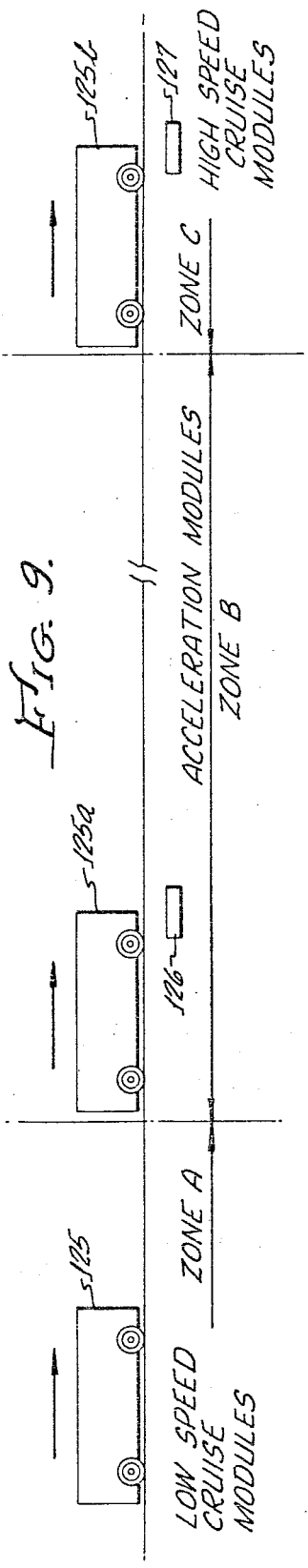
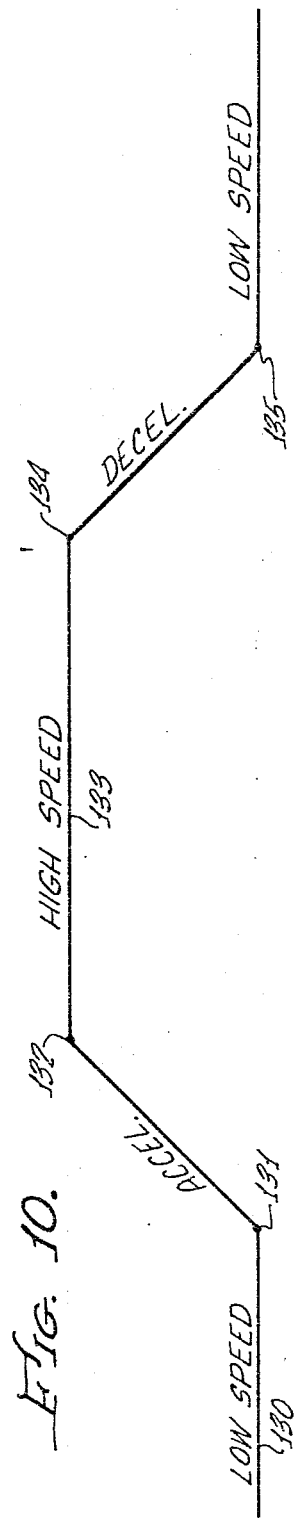
Fig. 8.
Fig. 9.
Fig. 10.

LINEAR MOTOR PROPULSION SYSTEM

BACKGROUND OF THE INVENTION

1. Field of the Invention

The present invention relates to propulsion systems, and more particularly concerns a system employing a plurality of linear motors having relatively movable parts fixed to the track and vehicle, respectively.

2. Description of Prior Art

For many years, most vehicular track or transit systems have commonly used a direct current electric rotary motor that is operated from power derived from a third rail, or have employed a diesel driven electric motor carried by the moving vehicle. Such systems are inefficient, uneconomical in many respects, and are dependent upon either a fuel supply carried by the vehicle or a transfer of power to the vehicle-carried motor. Where many such vehicles must move along a track in relatively closely spaced relation, headway control becomes a major obstacle to safe operation.

The linear induction motor has long been studied for application to propulsion of tracked vehicles. Various types of experimental systems have been recently developed. Such systems employ linear induction motors, which require a very small operating gap between the car and motor. The alternative, namely, a large gap, results in an exceedingly poor power factor and correspondingly low efficiency of the induction motor. Further, the onboard controller required for good speed control of such linear induction motor systems has not been available at reasonable cost.

So-called "peoplemover" systems include those of the type wherein relatively small trains are made up of cars carrying just a few passengers and automatically operated. In general, such systems require a large number of vehicles per unit length of track. Two hundred vehicles in operation per mile of track is typical. With little headway between vehicles, either the train velocity must be decreased below an acceptable and feasible magnitude, or a precise and highly reliable headway control must be provided.

The linear induction motor by itself does not offer adequate control of relative car position. In the linear induction motor system, position of a given car with respect to any other car is a function of applied electric voltage and frequency. It also varies with car loading, grade, wheel friction and wind load. Accordingly, a car will wander back and forth in position on the track relative to preceding and following cars as one or more of these many parameters varies. In general, all cars will bunch together behind the slowest car so that, in effect, all cars are running nearly as a single train. To avoid this, each car must be individually controlled in speed with respect to other cars by a complex central command and control system.

In the synchronous motor, an alternating current stator drive signal creates a magnetic field to which the traveling rotor is locked, so that the rotor will always move in synchronism with the alternating current stator drive. One such rotary synchronous machine is described in U. S. Pat. No. 3,321,652 for Dynamo Electric Machine, invented by L. G. Opel, and in a variation disclosed in U. S. Pat. No. 3,548,965 for Vehicle Wheel Drive with Outside Claw Tooth Rotor Synchronous Motor, invented by John J. Pierro. This type of synchronous motor has been adapted for use as a linear electric motor as described in U. S. Pat. No. 3,456,136 for Linear Electric Motor, invented by J. J. Pierro, and U. S. Pat. No. 3,448,363 for Speed Control System for Dynamo Electric Machine, invented by J. J. Pierro et al.

Although the linear synchronous motors described in the above-identified patents will offer many improvements as compared with a corresponding induction motor, the prior art does not suggest any method for controlling a number of such synchronous motors to provide a smoothly operating and efficient linear propulsion system of any substantial length. No suggestion is found in the prior art of a very long stator assembly, or of any method for shifting a rotor from one linear synchronous field and stator assembly to another without loss of the required synchronism between rotor and stator.

U. S. Pat. No. 3,448,363 describes a speed control for a synchronous motor, but this control is achieved in the manner analogous to the speed control of the induction motor. This patent controls speed by varying strength of the magnetic field of either the field coils or the stator coils. Fine speed control is achieved by varying both stator voltage and field current. Frequency is not employed for speed control. To the contrary, in U. S. Pat. No. 3,448,363 a commutator is provided to sense velocity of the rotor with respect to the stator and, in a closed loop system, varies the stator drive frequency so as to cause such frequency to be slaved to the rotor velocity. With such a speed control arrangement, factors that vary car loading will tend to initiate velocity changes. Such changes will not result in synchronous velocity as determined by the stator drive frequency, but will actually cause the frequency to vary so as to follow such changed rotor velocity. Thus, an external speed control signal in the form of a variable voltage or current must be applied to maintain a given speed and to maintain a desired headway.

Accordingly, it is an object of the present invention to provide a propulsion system employing linear motors having improved apparatus and methods for speed control and for control of other operating modes.

SUMMARY OF THE INVENTION

In carrying out principles of the present invention in accordance with a preferred embodiment thereof, there are provided a series of linear synchronous motors comprising mutually discrete stator and field coil thruster modules, and one or more rotors common to at least a group of the thruster modules and adapted to be propelled by consecutive thruster modules or by consecutive groups of thruster modules. Different groups of the thruster modules are controlled by different controllers that provide stator drive signals having a frequency that controls rotor velocity over the corresponding thruster modules. Modules of a group are all driven from a single controller or from common controller logic to insure synchronism. Velocity is controlled open loop. Rotors are moved from one group of thruster modules to another while the frequency and phase of the stator drive signals of such modules are synchronized. Rotor velocity is changed by sweeping the frequency of the stator drive signal from one frequency to another. Certain thruster modules under control of acceleration and deceleration controllers are positioned and operated to provide improved operation of the vehicles during deceleration for station entrance, during station travel and during acceleration from the station. In an alternate form of the invention, thruster modules are vehicle carried by propulsion by a track long, track fixed rotor.

SOME ADVANTAGES OF THE DISCLOSED SYSTEM

The described method and apparatus for a tracked propulsion system employing linear synchronous motors have many advantages. Open loop control of velocity by control of stator drive frequency precisely locks all cars on thrusters so controlled to the same speed. Velocity of each car is determined only by the frequency of the stator drive signal and is substantially independent of all other parameters (within the limits of torque supplied) including car weight, rolling friction, wind load, grade, etc. Thus, proper headway spacing is perfectly maintained at all times and the otherwise difficult speed control problem is avoided.

Furthermore, as compared with the linear induction motor, the gap between the rotor and stator can be made much larger in the linear synchronous motor system of the present invention for equivalent size and cost. The field coils, being energized independently of the alternating current stator drive, allow the gap to be adjusted with great latitude. Whereas a linear induction motor may require a gap of 0.030 inches, the linear synchronous motor can easily operate with a gap of up to 0.200 inches.

A further benefit of a linear synchronous motor is greatly improved power factor control. The ratio of useful current to total current drawn is controlled by the field winding and may be adjusted so that nonuseful current and, therefore, wasted power is minimized with significantly improved efficiency. Further, since a rotor may be entirely passive, no third rail power pickup is required.

BRIEF DESCRIPTION OF THE DRAWINGS

FIG. 2 is a pictorial view of a rotor and two adjacent thruster modules;

FIG. 3 is a cross-sectional view of a rotor bearing car mounted upon a track in relation to a thruster module;

FIG. 8 is a block diagram of several cars and thruster modules illustrating interthruster logic;

FIG. 9 illustrates aspects of the method of transferring rotors between groups of thrusters of different speed controlling frequencies;

FIG. 10 illustrates a speed change sequence;

FIG. 21 illustrates synchronization start logic; and

DETAILED DESCRIPTION

TRACK LAYOUT

Apparatus and method of propulsion and propulsion control of the present invention are of wide application to many different types of people and cargo conveying and transit systems. For purposes of exposition, the inventive principles are described as embodied in a people moving system. A system of such an expository embodiment comprises a track of closed loop configuration and a number of trains continuously propelled along the track to, through and from a station at which passengers may embark and disembark.

Figure 1:
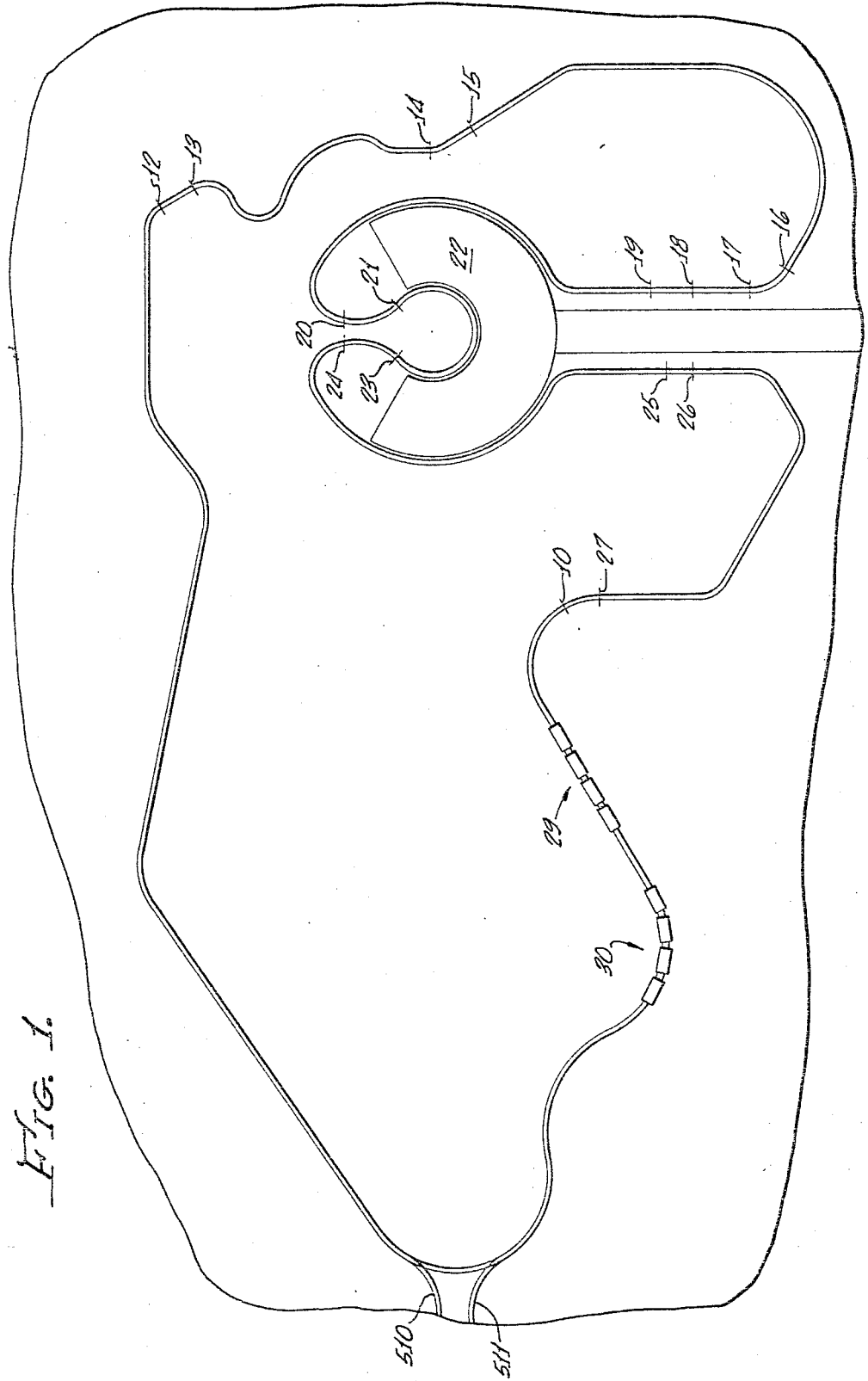
FIG. 1 illustrates an exemplary continous track layout and the various operating zones thereof in a system employing principles of the present invention.

An exemplary layout of such a track system is illustrated in FIG. 1 wherein a track includes a main high-speed cruise zone that extends from point 10 through a major portion of the track to a point 12, thence through a deceleration zone to a point 13, a low-speed cruise zone to point 14, an acceleration zone to point 15, a second high-speed cruise zone to point 16, a second deceleration zone to point 17, a relatively short cruise zone to point 18, an acceleration zone to point 19, and a cruise zone that extends to a station entrance deceleration zone at point 20. The station entrance deceleration zone is shiftable, as will be described hereinafter, and nominally extends to point 21, which is the rear of a variable-speed loading zone that extends about a passenger loading and unloading platform 22. If deemed necessary or advisable, the platform 22 may rotate or otherwise move at or near station speed of the trains to facilitate embarking and disembarking of passengers. A station exit acceleration zone begins at point 23 and at point 24 becomes an intermediate-speed cruise zone until a decleration zone at point 25. The latter terminates at point 26, beginning a low-speed zone that extends to point 27 where acceleration is commenced to bring the vehicle up to the high-speed cruise that starts at point 10.

Traversing the described track, in a clockwise direction in this example, is a group of trains of which two are illustrated at 29 and 30. Each train comprises four conventionally interconnected cars. The track itself may be formed of any desired design and configuration to support and guide the conventional wheeled structure carried by each of the cars.

It will be readily appreciated that the specific track configuration and layout, the number, location and velocities of cruise, acceleration, deceleration and loading zones, the number of trains and the number of cars all may be widely varied to suit requirements of different usages without departing from principles of the present invention. In the exemplary system, each is eight feet long to provide a length of each train of 33 feet including bumpers (not shown). The described track in this specific example is about one mile in length. In the disclosed embodiment, the high-speed cruise zones propel the vehicles at 9.9 feet per second, intermediate- and low-speed cruise zones at 6.6 and 3.3 feet per second, respectively, and the variable-speed loading zone may be selectively controlled to provide any one of a number of different velocities between 0.495 and 2.5 feet per second.

LINEAR SYNCHRONOUS MOTOR MODULES

In accordance with principles of the present invention, novel methods and apparatus of propulsion and propulsion control employ a plurality of linear synchronous motors. An example of one such linear synchronous motor that may be employed herein is shown in the above-mentioned patents to Pierro, particularly U. S. Pat. No. 3,456,136. Briefly, such a motor comprises a thruster assembly having field and stator coils and a driven rotor formed with oppositely poled interdigitated poles of magnetic material. The field coil is energized with a DC signal and provides a magnetic flux that flows through a path including both field and stator and a pair of adjacent opposite magentic poles of the rotor. The stator is energized by an AC stator drive signal and thereby creates a magnetic wave that travels along the stator at a velocity that is directly proportional to stator drive signal frequency and to the distance between adjacent stator magnetic poles. This traveling stator wave reacts with the flux that flows through the field and rotor to propel the rotor. In the Pierro system, velocity of the traveling stator magnetic wave is maintained exactly the same as the velocity of the rotor. The two are relatively fixed and displaced by a substantially constant phase (torque or thrust) angle and a thrust is exerted upon the rotor that is directly related to the strength of the magnetic fields, and the load. The torque angle is generally maintained at a relatively small value. Further details of construction and operation of such a linear synchronous motor are fully described in the above-identified Pierro patent.

According to the present invention, principles of this linear synchronous motor are employed in a tracked vehicle propulsion system. As illustrated in FIG. 2, a series of discrete thruster modules (sometimes termed "thrusters" or "modules"), such as modules 32, 34, are fixed to the track between rails 33, 35. It will be understood that similar thruster modules are positioned along the entire track at the various spacings indicated hereinafter. Each thruster module includes a field 36 and a stator 37, which are energized from power sources and thruster module controllers to be described more particularly below.

Each car, such as car 38 schematically illustrated in FIG. 2, fixedly carries a rotor 40 that preferably extends nearly the full length of the car along and in close proximity to the upwardly facing stator poles of the thruster modules. Each car rotor is, in effect, a rotor common to all of the thruster modules and is adapted to be propelled by consecutive thruster modules, one after the other.

The phrase "one after the other" as used herein includes all of the several conditions wherein the individual rotor may be of such length, as compared to thruster module spacing, as to be propelled by consecutive thrusters one at a time, and further includes the illustrated condition where the rotor will span two thrusters of a group of consecutive thrusters and is propelled by different groups of thrusters, one group after the other.

The arrangement illustrated in FIG. 2 depicts a section of the track at which the thruster modules are spaced one from the other at a center-to-center distance of 6.6 feet, each thruster module having a length of approximately 2.0 feet. Thus, the illustrated 8-foot car and 8-foot rotor will, in some conditions, span two full thruster modules, being propelled simultaneously by both and, in other positions, span but a single thruster module. However, as will be described below, a four-car train is arranged such that the number of poles continuously engaged does not vary more than about five percent.

OPEN LOOP VELOCITY CONTROL

A significant aspect of the apparatus and methods of the present invention involves the headway control that is achieved by open loop frequency control of velocity. In accordance with the present invention, the several cars or trains positioned at any given instant at different points along the track are driven at selected speeds by driving the stators of the several thrusters with stator drive signals of predetermined frequency. These drive signals are all derived from the same or synchronized sources so that within any speed zone all stator drive signals are of like phase and frequency.

The power to the thrusters is sufficiently large to provide an adequate safety margin and to insure a rotor drive sufficient to maintain its synchronism with the velocity of the traveling magnetic wave of the stators. Accordingly, the rotors of the synchronous linear motors are driven by a thrust that maintains a substantially fixed phase angle between the rotor poles and the traveling magnetic wave of the thruster stators. As long as the driving power to the stator is adequate, the rotor cannot depart significantly from the velocity sufficient to maintain this phase angle within a relatively small range. In the event of a catastrophe, or an obstacle on the track so that the train is forced to stop, or change velocity, the synchronism is lost, propulsion is gone, and the train will continue only until its momentum is exhausted. In the event of an unprogrammed stop, sensors along the track will immediately signal for a commanded emergency stop of all vehicles.

This open loop control of velocity by means of frequency is a considerable improvement over the speed control system shown in the two Pierro patents, U. S. Pat. Nos. 3,456,136 and 3,448,363, which show but a single rotor and stator. In these systems, a rotor position sensor, such as commutator 14 of the '363 patent or commutator 76 of the '136 patent, provides a feedback signal to control the frequency of the stator drive so that the traveling magnetic wave frequency of the latter will always follow the rotor velocity. If the rotor should experience an increased load, rotor velocity decreases. The decreased rotor velocity is signaled to the stator frequency drive, which is decreased so that the rotational speed of the traveling stator field is maintained exactly in step with the rotor field, leading it by constant displacement angle.

To vary speed, the Pierro patents selectively vary the thrust, but not the frequency. Thus, speed is controlled by varying the stator voltage, or varying the field, or both, but stator drive frequency is at all times slaved to rotor velocity. In the speed control achieved by Pierro, rotor velocity accordingly can vary with load or other external conditions and must be corrected by a command speed control signal. In the system of the present invention, on the other hand, the rotor is at all times locked to a fixed or speed controlling stator drive signal frequency and it is this frequency that is varied directly if rotor velocity is desired to be varied. This is one of the reasons that the present system is uniquely adapted for vehicle propulsion.

Use of direct control of frequency to vary rotor velocity greatly facilitates velocity change of the rotor as it moves from one cruise zone to another of different velocity. As described below, such velocity change is acheived by sweeping the stator frequency of a group of acceleration or deceleration modules, but insuring a period of phase and frequency synchronization at each end of such frequency sweep to enable the rotor to transit from one zone to another. Such phase and frequency synchronization is more readily achieved in the present open loop frequency control of velocity.

CONSTANT THRUST

In a passenger-carrying system, as in many other vehicular systems, smooth continuous motion is highly desirable. Pulses of thrust or sharp and rapid variations in thrust considerably degrade the quality of the ride. However, the fundamental nature of a series of discrete mutually spaced thruster modules is such that thrust pulses are normally expected. To minimize thrust variation experienced by the propelled vehicle, and also to increase the total thrust available to propel a car, the spacing of the thrusters, the distance between consecutive thrusters, the length of each car and its rotor and the number of mutually fixed cars in a train are all selected as mutually dependent parameters for a given system. Each car, and therefore the single continuous rotor carried thereby, which extends for the full length of the car, is made with a length sufficient to completely span two modules. With this arrangement, the rotor is always under the influence of at least one full length of stator module. In many positions, the rotor will be fully covering but a single thruster module. In other situations, the rotor will bridge two consecutive modules, having one end over one module and the other end over the next module. Although the total thrust available from the single stator that is fully covered by a rotor, or from the pair of adjacent stators, each of which is covered by the same rotor, may vary, the rotor velocity is locked to magnetic wave velocity so that substantially no acceleration or deceleration is noticeable because of this varying thrust.

The intermodule, or interthruster, spacing is chosen and the relative positions are chosen to insure that the traveling magnetic wave generated by one stator will have the same space phase as the traveling magnetic wave generated by the next adjacent stator when the two are driven by stator drive signals of like phase and frequency. With this arrangement, the phase angle between the traveling magnetic wave of the stator and the interdigitated salient rotor poles will be the same at all points of the rotor and at all positions of the rotor, whether the rotor is entirely over but a single thruster module or over two adjacent modules.

It will be understood that a functionally equivalent alternative arrangement would employ adjacent modules spaced from each other by a distance equivalent to some fraction of the length of a cycle of the stator traveling magnetic wave and driving such adjacent stators with signals having a mutually different phase, according to the module spacing.

Just as the spacing of adjacent thruster modules and length of rotor are chosen to maintain a fixed phase angle (thrust is proportional to phase angle in the linear synchronous motor) for a single car, similar considerations control the choice of spacing of mutually fixed cars of a train of cars. In a typical example, four cars, each of the dimensions above described, are interconnected to from a single train of 33 feet in length. The cars are connected so that the distances between the poles of the rotors are integral multiples of the pole pitch so that the traveling magnetic wave of several consecutive thrusters will always bear the same space phase angle relative to the rotor poles.

In the exemplary system described herein, each rotor extends for substantially a full car length. The 33-foot train of four 8-foot cars is propelled by thruster modules 2.0 feet in length, spaced at 6.6-foot center-to-center intervals (other spacing is used for station entrance and exit zones, as described below). This enables the four rotors of a single train to be propelled by the equivalent of the full length of four thruster modules at any given time, taking into consideration any inactive portion between cars. The train is always fully over four consecutive thruster modules and either completely over a fifth or partly over both a fifth and a sixth. The arrangement of spacing and lengths is such that the total number of rotor poles that are within the influence of the thruster moudles is substantially constant as the train progresses along the track. As the rear end of the rotor of the rearmost car begins to traverse a thruster module (so that fewer rotor poles will be influenced thereby), the front end of the rotor of the leading car of the same train begins to traverse a module at the front of the train. Power to the thrusters is such that adequate propulsion force (and safety margin) is available for the maximum demand of the system, namely, that required of the acceleration zone thrusters, even in the absence or failure of one of the thrusters.

Thus, the specific spacing between adjacent modules and between adjacent rotors of cars of a single train provides a nearly constant thrust, always having the same space phase angle between stator magnetic wave and rotor, and always having substantially the same number of rotor poles within the influence of the thruster modules. This balancing of thrust is important, not only from the standpoint of a smooth ride, but also from the standpoint of efficiency of operation and manufacture. If the thrust should be allowed to vary as the train or car is propelled along the track from one thruster module or one group of modules to another, greater damping would be required in the rotor and efficiency of the overall propulsive drive would be decreased.

Figure 4:
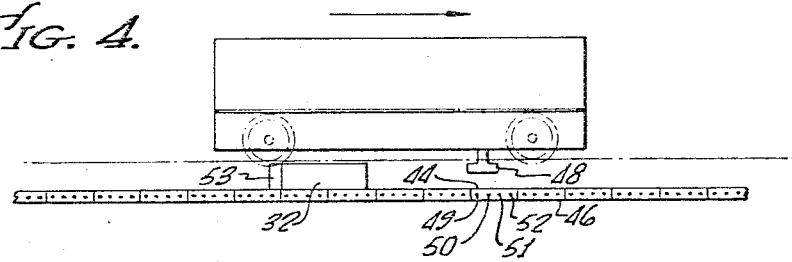
FIG. 4 is a side elevation of the car, rotor, track and thruster module, together with certain position sensing and sensor actuating devices.

Details of a car rotor and thruster relation to each other and to the track and track sensors are illustrated in FIGS. 3 and 4. Each thruster module, such as thruster module 32, is fixedly secured to the bed of the trackway between the rails 33, 35 and above a cable conduit 42 that extends throughout the length of the track. The car wheels 37 ride on the rails, positioning the rotor 40 (fixed to the underside of the car) closely adjacent to the upper surface of the thruster module to provide a working gap of approximately 0.15 inches in this embodiment.

For certain control functions, to be described below, car position must be sensed with a relatively high resolution (within several inches, for example). To this end, a series of reed switch assemblies, such as assemblies 44 and 46 of FIG. 4, are fixed to the track in continuous end-to-end relation, but only in and about the station zone, to act as position sensors. These reed switches provide an output signal when influenced by a magnetic switch actuator 48 in the form of a magnet carried at the forward end of each train. Assemblies 44, 46 may be covered by a shield having openings or windows positioned so as to restrict the field of influence of the magnetic actuator. Each reed switch assembly comprises four discrete switches 49, 50, 51 and 52, mutually spaced by approximately 3.3 inches. Magnetic switch actuator 48 has a length sufficient to span two adjacent switches so that redundant operation may be achieved. When any one or pair of reed switches is within the magnetic influence of the car-carried magnetic actuator 48, such reed switch closes an electrical circuit to provide a position signal that is supplied to sensing and control logic, to be more particularly described below.

Each thruster module, such as the thruster module 32, includes at its rear end, the end that is first passed by an oncoming car, a thruster control indicated at 53 in FIG. 4. This thruster control, to be described in detail below, includes a proximity sensor to detect the arrival of an oncoming car and also includes certain thruster control and interthruster logic.

GENERAL CONTROL ARRANGEMENT

Referring again to FIG. 1, each of the several zones or track sections, the various cruise zones, the acceleration and deceleration zones and the station zones all employ a number of thruster modules. In general, the above-described 6.6-foot spacing between modules is employed in all zones except the zones in and about the station. All modules in any given zone are energized with a stator drive signal of like phase and frequency. To this end, different groups of the modules are each energized by different controllers that provide such stator drive signals. For example, the low-speed cruise zone between points 17 and 18 has 10 thruster modules, all under control of a single controller. The longer low-speed cruise zone between points 26 and 27 has 56 modules that are separated into two groups, each of which is under the control of a separate controller. Similarly, the thruster modules in the other zones are grouped for operation under different ones of the various controllers.

Where the number of thruster modules in a zone is large enough to require more than one controller, the latter are driven by the same logic (described below) so as to insure phase and frequency synchronism. However, where cruise zones of the same speed are separated by an interposed acceleration or deceleration zone, their controllers need not be synchronized in phase with each other because of the phase and frequency synchronization that is achieved between mutually adjacent cruise and acceleration or deceleration controllers. Details of typical controllers are described below and shown in FIG. 6.

Figure 5:
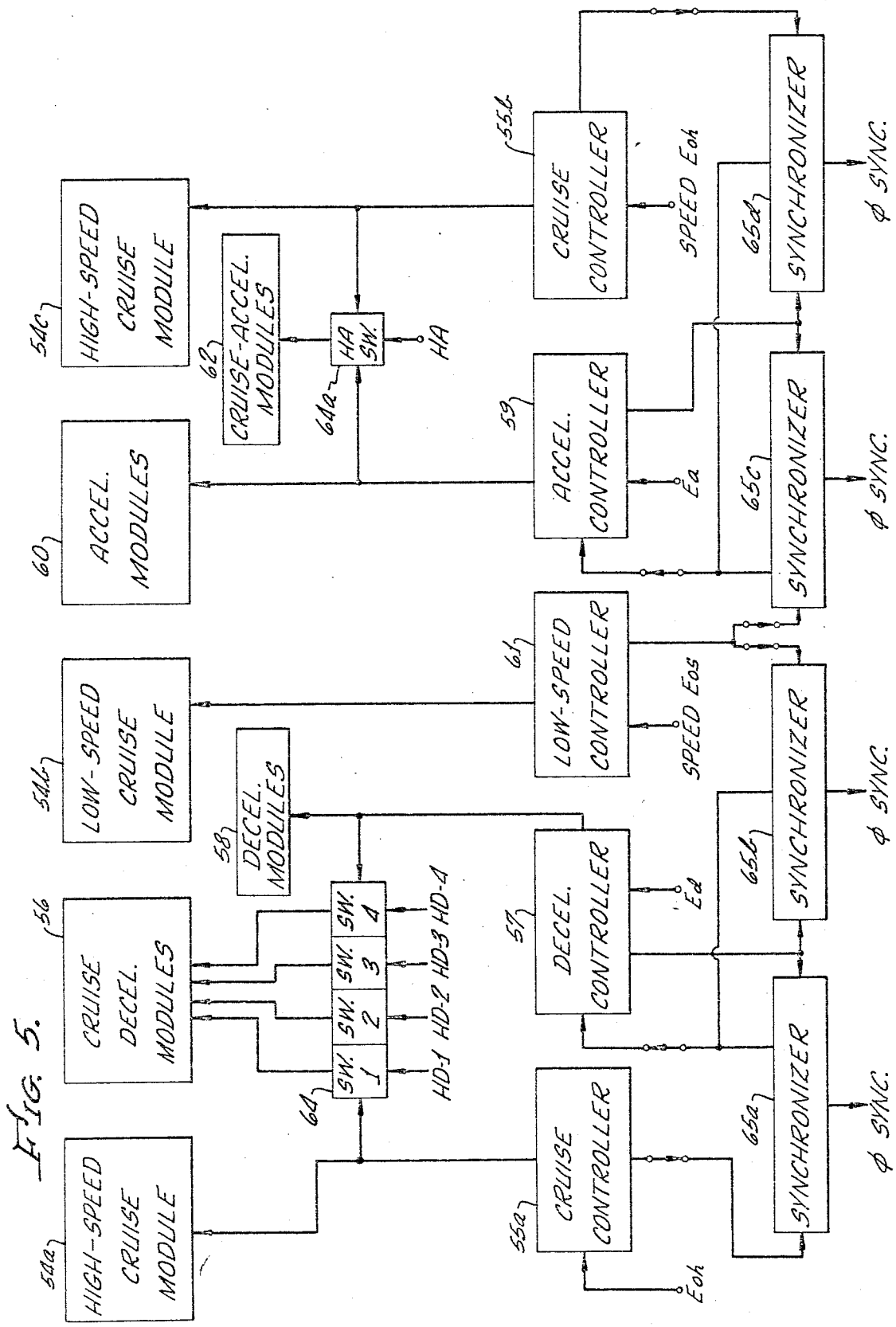
FIG. 5 is a simplified block diagram of the basic operating units of the system, showing, in particular, the control arrangement in and about the station.

FIG. 5 is a simplified block diagram of the control arrangement of a linear synchronous motor propulsion system embodying principles of the present invention. The arrangement shown is of general application throughout the system, although certain apparatus schematically depicted in this figure is employed only in and about the station. The thruster modules are schematically depicted as being of several different functions. These include cruise thrusters 54a, 54b, 54c that basically provide a fixed or cruise velocity (of selected magnitude) to the train that is being propelled thereby. A plurality of cruise deceleration thrusters 56 is operable in either of two alternative modes, the first of which is a fixed velocity cruise mode and the second of which is a deceleration mode. In this mode, the stator drive signal is provided with a frequency ramp. That is, the frequency of the stator drive signal is caused to decrease with a predetermined slope of frequency versus time. Since the rotor is driven at a velocity that is proportional to stator drive signal frequency, the rotor velocity will decrease to follow the decelerating frequency ramp.

A plurality of acceleration thrusters 60 is driven with an increasing frequency ramp, a stator drive signal having a frequency that increases with a predetermined relation of frequency and time. Thus, the rotor and cars driven thereby will decrease or increase in velocity in synchronism with the decrease or increae of frequency of the deceleration or acceleration thruster module stator drive signals.

The low-speed modules 54b include a plurality of station thruster modules that are provided along the section of track within the station area and arranged to be driven with one of a number of discrete fixed frequencies so that any one of a number of different station velocities may be chosen, thereby to allow various dispatch intervals.

Station speed and dispatch interval may be selected according to the number of trains on the track at any given instant so as to insure that there is at least one train in the station at all times.

A group of cruise acceleration thrusters 62 is provided at the station exit acceleration zone. These may operate in one of two modes to thereby facilitate lengthening of the station exit acceleration zone. The modules 62 may be operated in either a fixed velocity cruise mode or an increasing velocity acceleration mode.

The various thruster modules are driven by a number of controllers of which four types are provided, differing in the nature of the velocity commanding input thereto. These controllers provide the stator drive signals to the several thruster modules. A group (two are shown in this figure) of cruise controllers, 55a, 55b drives the cruise thruster modules 54a and 54c with fixed frequency stator drive signals of a frequency determined in accordance with the desired velocity within a given zone. A group of deceleration controllers 57 drives deceleration thruster modules 58 with a frequency that decreases from a first frequency to a second frequency. The deceleration controllers are frequency and phase synchronized so that, when they drive with a first fixed frequency, such frequency will be exactly synchronized both in phase and frequency with the stator drive signal provided by another controller. Similar synchronization is achieved for the second fixed frequency (lower end of the frequency ramp) provided by the deceleration controller 57.

To operate cruise deceleration thruster modules 56 in one or the other of two modes, they are driven alternatively by a cruise controller 55a, or a deceleration controller 57, depending upon the condition of a power switch 64.

Acceleration controllers 59 are provided to drive thruster modules 60 with a stator drive frequency that varies from a first frequency synchronized in phase and freqnecy with one controller to a second frequency synchronized in phase and frequency with a different controller.

Low-speed controller 61 drives modules 54b at a selected one of a group of fixed low or station speeds.

For station exit use, cruise acceleration thrusters 62 are operated by either an acceleration controller 59 or a cruise controller 55b in accordance with the position of a switch 64a. A plurality of frequency and phase synchronising circuits, including those designated at 65a, 65b, 65c, 65d, receives signals from controllers to be mutually synchronized and feeds an error signal to the deceleration or acceleration controllers which are thereby synchronized in phase and frequency to an appropriate fixed speed controller. The reference or fixed frequency inputs to the synchronizing circuits and their outputs are switched as indicated in FIG. 5 to allow synchronization to alternative frequencies.

Suitable analog voltages that determine speed are fed to the respective controllers. Additional logic signals, such as the sync signals from the synchronizing circuits, and to and from the thruster modules, are also provided for use in logic circuitry, to be described in detail hereafter.

TYPICAL CONTROLLER

Figure 6:
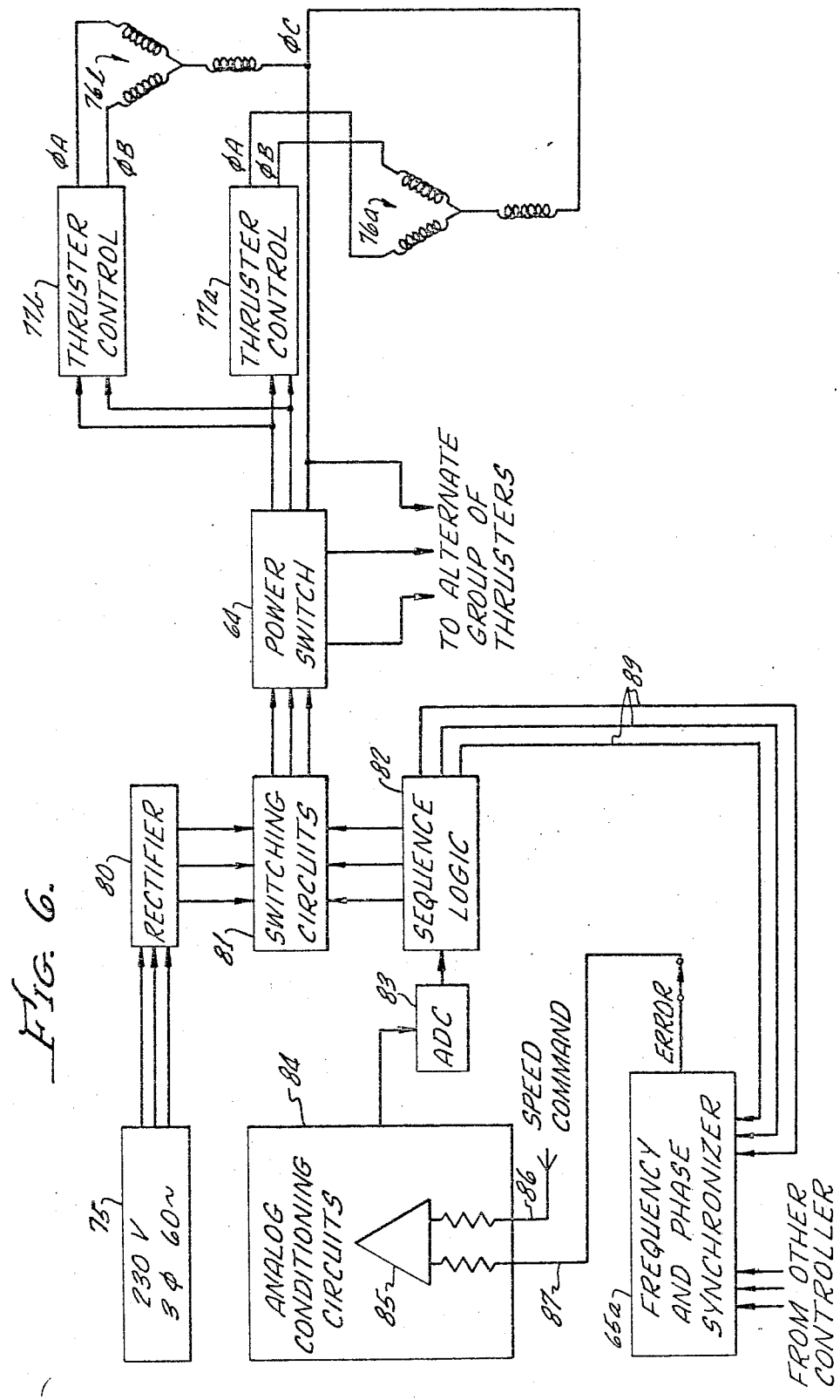
FIG. 6 is a block diagram of a typical controller, together with certain input and output circuits therefor.

Illustrated in FIG. 6 is a block diagram of a typical controller, together with two of a group of stators driven thereby, and certain speed controlling and synchronizing inputs. The controllers are externally controllable inverters of a well-known type, such as, for example, the Dynahertz Inverter, Model No. DHZ-120-20-MZ or DHZ-030-60-MZ, manufactured by Dynamatic Division of Eaton Yale & Towne, Inc., of Kenosha, Wisconsin. As illustrated in FIG. 6, each controller receives an AC input signal, such as a 230-volt, three-phase, 60-cycle signal, from a supply 75, and furnishes a three-phase output signal having phases A, B and C to a group of thruster modules of which two are illustrated in FIG. 6, having stators 76a and 76b. One phase, phase C, of the stator drive output signal of each controller is fed directly to one of the stator coils in all thruster modules, since it is not necessary to switch or otherwise control this phase. The other phases of the stator drive signals are fed to the stator coils via the thruster control indicated at 77a or 77b, and shown in FIG. 7, for the particular modules. The thruster module may be turned on or inhibited under command of the thruster control, as will be explained below in connection with FIG. 7. Phases A and B of the controller output are fed through an interlocking power switch 64 (also shown in FIG. 5) so as to permit this particular controller to alternatively drive different groups of thruster modules. Switch 64 is omitted for those controllers that always drive the same modules.

The three-phase alternating signal from supply 75 is fed to a three-phase bridge or rectifier 80 within the controller. This provides a DC supply that is fed to a group of inverter switching circuits 81, employing SCR circuitry to switch the DC power under control of three series (trains) of switching control pulses provided from a sequence logic circuit 82, also contained within the inverter. Timing and repetition rate of the three series of switching control pulses that are provided at the output of logic circuit 82 are controlled from the output of an analog-to-digital converter 83. The latter provides to the sequence logic circuit 82 a series of output pulses having a repetition rate proportional to the magnitude of an analog input signal. This pulse signal series that is fed to sequence logic 82 may be digitally produced, if deemed necessary or desirable, by means more particularly described hereinafter. The analog input signal to the analog-to-digital converter is derived from analog conditioning circuit 84 of the inverter, including an amplifier 85 having a pair of analog signal inputs on lines 86 and 87.

A speed-control command signal in the form of an analog voltage having a magnitude proportional to the commanded stator drive signal frequency, and therefore proportional to the commanded train speed, is fed as a controller input on line 86. A second controller input on line 87 is an error signal produced by the phase and frequency synchronizing circuit, such as circuit 65a, 65b, 65c, or 65d of FIG. 5. This error signal effects relatively small adjustments in the analog signal at the output of conditioning circuits 84 for synchronization of phase and frequency of the stator drive signal that is provided at the output of switching circuits 81.

For the purpose of achieving frequency and phase synchronization, the three signals (collectively comprising a three-phase square-wave signal) of switching control pulses that are fed to the switching circuits 81 from the sequence logic 82 are employed to provide an output on lines 89 for comparison in the frequency and phase synchronizer 65a with three corresponding switching control pulse signals (also a three-phase square-wave signal) of a second controller with which the illustrated controller is to be phase and frequency synchronized.

The time available for synchronization of acceleration or deceleration modules with the preceding and following fixed sped modules may be very short. Phase and frequency synchronization are achieved by synchronizing circuits 65a, etc., during a period of about 2 seconds or in the period of as few as two cycles (for a 1 Hz signal) by means of an arrangement shown in detail in a co-pending application of Daniel F. Schaefer for a Zero Degree Phase Lock System, Ser. No. 229,867, filed Feb. 28, 1972, and assigned to assignee of the present application. The disclosure of this co-pending application of Daniel F. Schaefer is incorporated herein by this reference as though fully set forth.

The speed command signal on line 86 may be derived from any selected one of a group of fixed-voltage signals to achieve a fixed speed proportional to the fixed-voltage level. The speed command signal may also be in the form of an ascending or descending ramp where the controller is to operate the thruster modules with increasing or decreasing frequency, accordingly, to accelerate or decelerate the trains driven thereby. Details of typical ramp generators for generation of a speed changing command signal for the controller of FIG. 6 are described below and illustrated in FIGS. 11 and 12.

As previously explained, each controller provides a stator drive signal to one or more groups of thruster modules. Further, several controllers may all drive different groups of thruster modules at the same speed. Thus, all controllers driving high-speed (9.9 feet per second in the disclosed embodiment) cruise-control modules, for example, would have the same magnitude of analog input signal on line 86 for cruise condition, although this may be varied slightly to compensate for inherent differences between putatively identical controllers. Similarly, all controllers driving thruster modules with an intermediate-speed zone would have substantially the same voltage-level input to their analog conditioning circuit to provide the same intermediate stator drive frequency output signal. The acceleration and deceleration controllers will have a speed command that includes both high and low fixed-voltage levels and an acceleration or deceleration ramp, as described in detail below. All controllers may be operated by a start ramp or a stop ramp in the form of an increasing or decreasing analog voltage. During start, each controller will provide a ramp that continues to accelerate the vehicles until trains under its control have reached the normal operating speed for the particular zone.

For the station controllers, a number of discrete frequencies and therefore velocities are made available by selection of one of a group of fixed-level voltages as inputs on line 86. It will be understood that only station controllers have inputs from the station frequency signal generators and only cruise controllers have inputs from the cruise control command signals, etc. Thus, the several controllers may be identical, having their functions, in effect, determined by the nature of the inputs thereto. All controllers may be commanded in a stop mode that provides each with a decelerating ramp that slows all trains at a constant deceleration to a velocity of about one-half foot per second, at which time all controllers may be turned off to allow the train to roll to a stop.

All fixed speed controllers have the same operating characteristics except that the top speed is either low, intermediate or high speed in the described system. Each deceleration or acceleration controller has its own ramp generator.

The acceleration controllers are capable of accelerating a four-car train at a selected rate, such as 0.04g. Power requirements of the deceleration controllers are not nearly as great as for the acceleration controllers, since drag and other losses will aid deceleration. Nevertheless, for convenience of manufacture and assembly, deceleration controllers are made identical to acceleration controllers.

A standby controller may be provided to replace any one of the other controllers that may have failed, or that may be removed from service for maintenance.

THRUSTER CONTROL

The thruster control comprises circuitry that is physically a part of the thruster module package, each thruster module having its own thruster control. The thruster control functions to turn on and off each of the thrusters at appropriate times and to provide output logic signals indicating the particular state of the thruster, that is, whether it is on or off.

Figure 7:
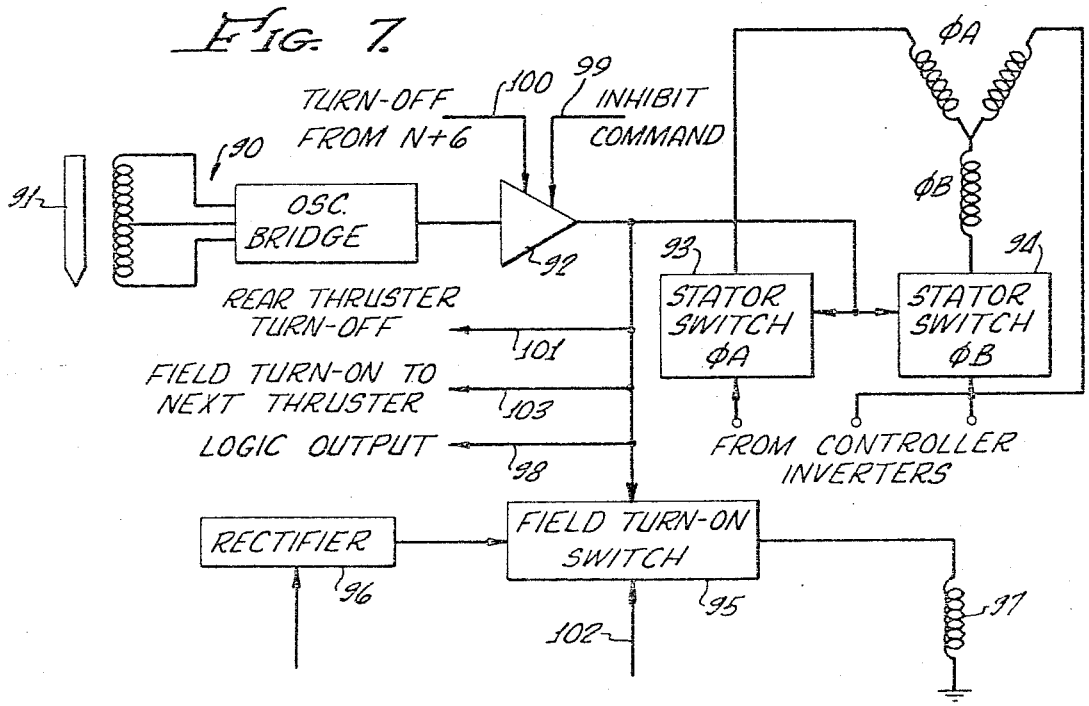
FIG. 7 is a block diagram of a thruster control, together with field and stator coils of a thruster module.

As illustrated in FIG. 7, each thruster control comprises a proximity switch, here illustrated as a bridge circuit 90 of an oscillator, having a magnetic core 91 that is physically positioned at the rearmost or uptrack end of each thruster module. This is the end of the thruster module that is first covered by the approaching train. The proximity switch is basically a bridge that will be unbalanced by the presence of metallic material adjacent its sensing point. Accordingly, as any car approaches a thruster control proximity switch, the switch is actuated and will remain actuated by self-latching circuitry that is provided within the oscillator bridge circuitry. For certain modules, as described below, this self-latching feature is omitted, so that the nonlatching module is on only during the time that its proximity switch is under the influence of an adjacent train. When actuated, the bridge provides an output signal to an amplifier 92, which, in turn, provides an operating signal to each of a plurality of stator switches 93, 94. Switches 93 and 94 are fed with phase A and phase B stator drive signals from the controller inverters and, when closed (operated by the output of amplifier 92), feed these to phase A and phase B stator coils. The third stator phase, like the other two phases, is derived from the controller that is in command of this particular thruster, but is fed directly and continually to the third stator coil since the latter need not be switched.

The switch operating signal from amplifier 92 also operates a field turn-on switch 95 which receives a controlled magnitude DC signal from a rectifier 96 that is energized, in turn, with an adjustable AC voltage signal from a transformer located at the control console. The output DC signal passed by switch 95 is fed to the thruster field coil schematically represented at 97.

In order to signal to the logic described below, the particular state in which any given thruster module is presently operating (e.g., whether it is on or off), the output of amplifier 92 is fed via a line 98 as a logic output from the particular thruster. Thus, the signal on line 98 is normally (in the absence of an adjacent train) false or logical "zero" and becomes true or logical "one" (unless inhibited) when its proximity switch senses the oncoming train.

Because the field coil may take some time to build to full field strength, the field coil is energized when the next rearward (uptrack) thruster control has its proximity switch actuated. Thus, a switch equivalent to switch 95 of FIG. 7 of thruster control N (FIG. 8) has a first operating input from a field ahead turn-on output (line 102) of the adjacent rearward thruster control N-1 that is earlier passed by the train. This switch also has a second and redundant control from the output of amplifier 92 of the thruster control of its own thruster to insure that the field is in fact energized when the train rotor is over this thruster control.

An inhibit command signal may be fed to amplifier 92 via a line 99 to entirely prevent operation of the individual thruster as may be required for certain conditions to be described below.

When the train has fully and completely passed the individual thruster (except for certain thrusters in and around the station as described below), this thruster may be turned off. Accordingly, a second inhibit, or turn-off, signal is provided from a thruster control N+6

(FIG. 8) via a line 100 as a second inhibit input to amplifier 92. This turn-off signal is provided as an output of an amplifier of the thruster control that is six thruster modules ahead of the instant control N. Accordingly, when the front of the train has progressed six modules forward, this thruster (N) is clear of the train and is no longer needed, wherefore it may be turned off. This rear thruster turn-off is a second signal provided as an output from each thruster control via a line 101 from the output of amplifier 92. A third output via line 103 is the field ahead turn-on signal that energizes the field of thruster control N+1 when the proximity switch of thruster control N is actuated. Thus, it will be seen that the thruster control provides both a rotor position sensing and interthruster control to turn the several thrusters on and off at preselected train positions and conditions. The position sensing afforded by the proximity switches is of a relatively low resolution compared with that afforded by the reed switches, but the former are available throughout the entire track (including the station), whereas the latter are provided only in and about the station.

ACCELERATION-DECELERATION

Because velocity control is open loop in this linear synchronous motor system, and because the stators of thruster modules are mutually displaced and driven at differing frequencies and in different zones, transition of a train from one zone to another is accomplished only while all modules that are active upon the train during the transition are driven at the same phase and frequency. Consider the situation illustrated in FIG. 9, for example, wherein a train 125 is traveling in a zone A under control of low-speed cruise modules and approaching an acceleration zone B wherein it will be driven by acceleration modules so that its velocity may be increased for cruise at a higher velocity under control of modules in a second cruise zone C. The cruise module stators are driven by a controller having a fixed-level speed control command input, whereas the acceleration module stators are driven by a speed control command input that changes from one level to another, as described more particularly hereinafter in connection with FIG. 11. Acceleration modules in zone B must be prepared to receive the train before it enters this acceleration zone. Such preparation is the synchronization in both phase and frequency of the stator drive signals from the acceleration controller with the stator drive signals from the cruise controller of zone A modules. This synchronization occurs when synchronization to the high-speed zone C controller is achieved, as described below.

As the train is in transition, partly in zone A and partly in zone B of FIG. 9, it is being driven by zone A modules under control of a first controller and by zone B modules under control of a second controller. All of these modules must be driven in synchrozined phase and frequency. During the transition between zones, the train experiences no velocity change and no other indication of such transition. When the train has completely left the cruise zone (and is in the position illustrated at 125a) so that it is solely under the influence of modules controlled by an acceleration controller, a proximity switch at 126 is actuated to thereupon command initiation of the increasing frequency acceleration ramp that controls the thruster modules of acceleration zone B. As described below in connection with FIG. 11, the acceleration ramp may be initiated by energization of a relay coil K-5 in response to actuation of the proximity switch at 126. All of the modules in this zone now increase in frequency. Train velocity, likewise, increases. The slope of the acceleration frequency ramp is such that the acceleration controller reaches its final or higher frequency before the train enters the next cruise zone C and in time to allow synchronization of the zone B acceleration controller with the zone C cruise controller. Before such entry takes place, and while the train is still entirely in the acceleration zone, the acceleration controller frequency, now at its higher value, is rapidly synchronized in frequency and phase to the frequency and phase of the fixed frequency stator drive signals of the controller for the thruster modules of cruise zone C. Synchronization is commanded by a signal from a proximity switch of a module near the end of the acceleration zone which causes the three-phase switching control signal (FIG. 6) from the zone C controller to be applied as a reference to the synchronizer for the acceleration controller.

As the train begins to enter the second higher speed cruise zone C and before it reaches the position illustrated at 125b, it is being driven partly by acceleration thrusters that are synchronized in phase and frequency with the thrusters of the cruise zone C that it is now entering. As the train completely leaves acceleration zone B, a proximity switch 127 senses the position of the front of the train, and provides an output signal that commands the acceleration controllers (as by releasing the actuation of relay coil K-5 of FIG. 11) to release its synchronization from the zone C controller and to rapidly switch back to the lower frequency for phase and frequency synchronization with the stator drive signals of cruise zone A, thus the acceleration zone modules are ready to accept entry of the next train from cruise zone A.

In a relatively long acceleration zone, such as that between points 10 and 27 of FIG. 1, which may be about 150 feet long having 30 acceleration modules therein, only one acceleration zone controller is employed, whereby all modules in this zone are operated in a like manner and only one train at a time is handled by the acceleration zone. In general, a longer zone of acceleration may achieve greater velocity increase. However, if closer headway is desired, even in such a long acceleration zone, two or more acceleration controllers can be employed, each controlling a different one of two or more successive groups of acceleration thruster modules. As a first train enters completely upon the first or rearward group of modules in such an arrangement, the acceleration controller will provide the desired frequency ramp and pass the first train in synchronism to the second or third groups of acceleration modules, all operating at the frequency of such groups. As the train has completely left a rearward group of acceleration thruster modules, these may immediately be swept back to and synchronized with the lower frequency so as to be ready to accept the next train even though the earlier train is still within the acceleration zone. In effect, the train is conducted from one acceleration zone into another before entering the higher speed cruise zone. Further details of a variation of this multiple-section acceleration (deceleration) zone are described hereinafter.

Figure 12:
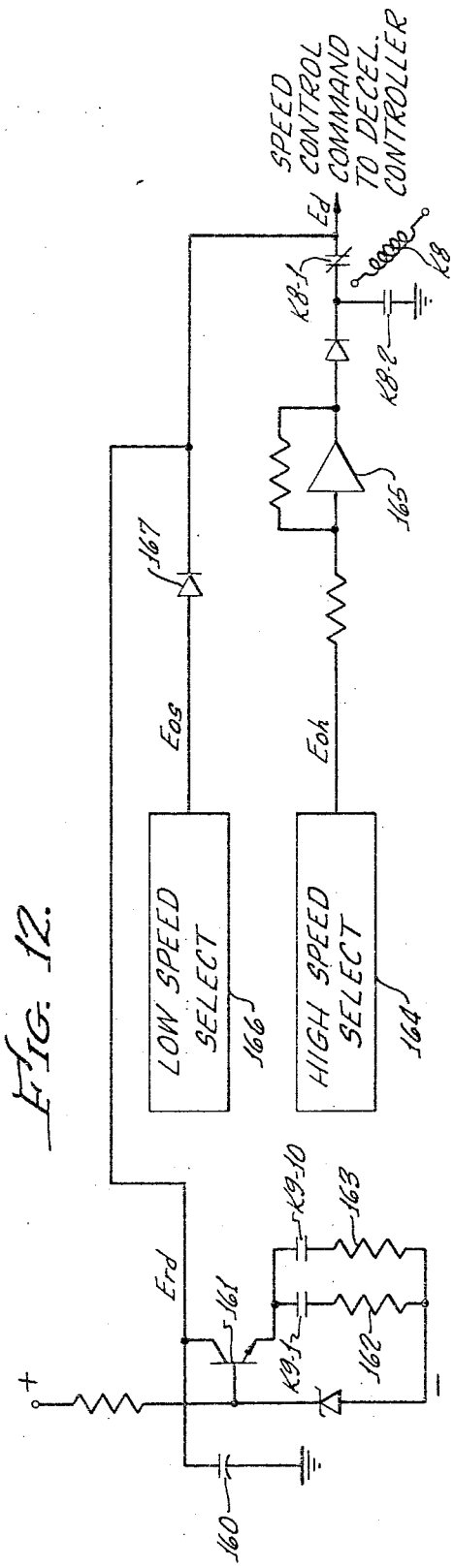
FIG. 12 is a diagram of a speed control and ramp generator for sweeping the frequency of a deceleration controller.

The principles described above for transition to higher velocity are also applicable to deceleration where the speed change (deceleration) controller is initially synchronized to the phase and frequency of the higher speed controller, then ramps down (as indicated in the circuit of FIG. 12), is synchronized with the lower speed controller and then rapidly sweeps back. Here too, if deemed necessary or desirable, a plurality of contiguous separately controllable speed change zones may be employed and interposed as a group between two fixed-speed cruise zones.

SPEED CHANGE AND RAMP GENERATORS

Graphically illustrated in FIG. 10 is a typical sequence of speed change (analogous to FIG. 9) wherein the train is traveling on a track portion 130 at a low fixed-cruise velocity, such as 6.6 feet per second for example. At point 131, acceleration is to be started so that, when the train reaches point 132, it will be at a high-speed cruise velocity, such as 9.9 feet per second for example. At some point, such as point 134, deceleration begins and is completed when the train is at point 135, at a succeeding low-speed cruise velocity, which may be the previous low speed of 6.6 feet per second or some other speed, such as for example 3.3 feet per second.

The speed change from low speed on section 130 to high speed on section 133 and the speed change from the high-speed to the low-speed section are both accomplished by speed-control command signals that are fed to the several controllers from respective ones of the several ramp generators.

Referring again to FIG. 5, the train, when cruising at low speed in the speed change sequence of FIG. 10, is being propelled by thruster modules under control of a low-speed controller 61 (FIG. 5) that has an appropriate fixed-speed control command signal ($E_{os}$) fed as an input thereto. When the train begins its acceleration, it will be on a section of track at which the thruster modules are controlled by an acceleration controller 59, which receives a variable-speed control command signal $E_a$. Initially, the acceleration controller 59 is synchronized in phase and frequency with the low-speed controller 61, so that the train may readily pass from control of thruster modules driven by the low-speed controller to control of thruster modules driven by the acceleration controller. When the train is fully over the acceleration thruster modules, the speed control signal $E_a$ that is fed to the acceleration controller beings to increase at a predetermined rate until it reaches a high-speed level, at which time the train may be propelled by thrusters under control of a high-speed cruise controller 55b that receives a fixed high-speed control command signal $E_{oh}$.

The variable and varying control signal to the acceleration controller 59 is provided by three distinct analog voltages. The first is a relatively low fixed-voltage, low-speed control signal $E_{os}$, the second is a linearly increasing ramp voltage $E_{ra}$, and the third is a high fixed-voltage, high-speed control signal $E_{oh}$. These voltages are all provided by the acceleration ramp generator shown in FIG. 11. A linear ramp for acceleration and deceleration is described for purposes of exposition. Other curves of freqency versus time may be employed as deemed necessary or desirable.

Figure 11:
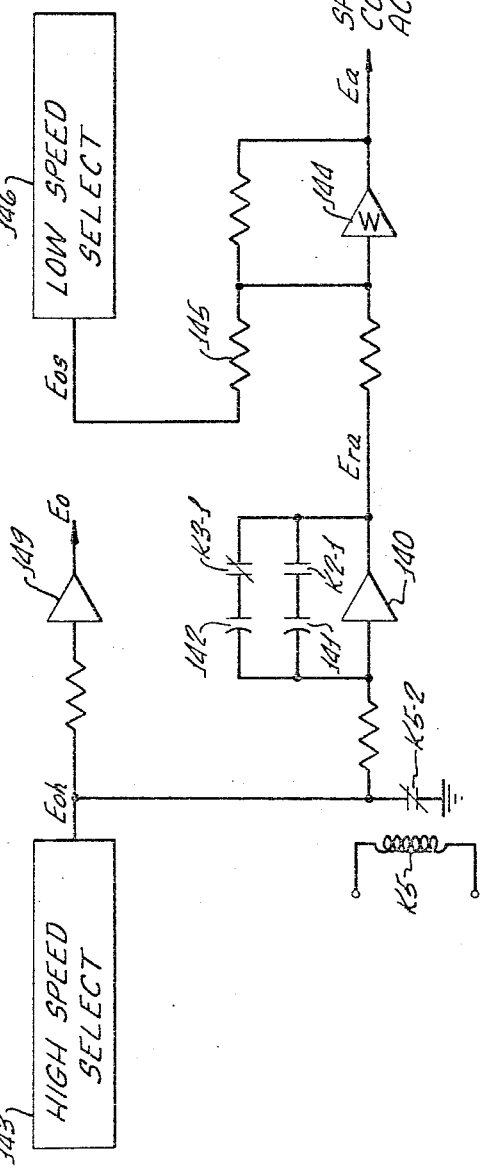
FIG. 11 is a diagram of a speed control and ramp generator for sweeping the frequency of an acceleration controller.

Although many circuits may be arranged to generate the acceleration speed control command signals, it is found convenient to employ an integrating amplifier 140 with a plurality of feedback capacitors 141, 142 that are separately selectable by operation of relay contacts, such as K2-1 and K3-1. A high-speed or cruise signal $E_{oh}$ is selected by the operator via selector 143, and this signal is fed to the input of the integrating amplifer 140. Relay coil K5 is normally de-energized. Therefore its contacts K5-2 are closed as illustrated in FIG. 11 to ground the input of amplifier 140. In this situation, there is but a single input to a summing amplifier 144. This input is provided via a resistor 145 from a low-speed selector 146 as the low speed signal $E_{os}$. Accordingly, the acceleration controller 59 (FIG. 5) is normally (when relay K5 is de-energized) supplied with the low-speed control command signal $E_{os}$. When relay K5 is energized, contacts K5-2 are opened and the output $E_{ra}$ of integrating amplifier 140 increases to approach its input $E_{oh}$. Now the output of summing amplifier 144 is the sum of the two signals $E_{os}$ and $E_{ra}$, the acceleration ramp signal, wherefore the acceleration controller is caused to accelerate the trains.

When relay K5 has once again been de-energized, the input to the integrating amplifier is again grounded by contacts K5-2 and the output of summing amplifier 144 rapidly returns to its lower value $E_{os}$. The rate of increase of $E_{ra}$ is determined in part by the feedback capacitor (141, 142) of amplifier 140. Accordingly, different rates of acceleration are available (within the thrust capability of the motors) by closing one or the other of contacts K2-1 and K3-1. Obviously, more than two selectable feedback capacitors (and acceleration rates) may be employed.

When the train is cruising at low speed, the acceleration controller 59 has been synchronized in frequency and phase to the low-speed controller 61 and relay contact K5-2 is closed to ground the input to amplifier 140. Thus, the output of amplifier 144 is clamped to the selected low fixed voltage $E_{os}$. Relay contacts K5-2 are released to initiate acceleration. The voltage at the output of amplifier 140 begins to rise until it reaches the high fixed voltage $E_{oh}$ that is selected by the high-speed selector 143. During this time, relay contact K5-2 remains open.

When the train nears the end of the acceleration zone, at a point where the ramp voltage has reached or nearly reached the selected high-speed voltage, the acceleration controller is synchronized in frequency and phase with the high-speed controller of the following high-speed cruise zone and the train continues to pass from the acceleration zone to the high-speed cruise zone, moving from propulsion by acceleration controlled modules to propulsion by the speed cruise controlled thrust modules. When the train is entirely out of the acceleration zone and completely under control of the high-speed cruise modules, the acceleration controller is recycled to its low-speed low-frequency so as to be ready to accept the following train from the low-speed zone. At this time, relay contacts K5-2 are closed to thereby clamp the acceleration controller to the low fixed voltage.

Illustrated in FIG. 21 is a mechanization of the logic for starting synchronization of an acceleration controller with a high-speed cruise controller. As previously described, synchronization must be completed before the train is propelled by the high-speed cruise modules. The acceleration ramps are so chosen that the upper speed of an acceleration ramp will be reached before the train is propelled by the cruise modules that it is approaching. Nevertheless, synchronization should not and cannot be started until the acceleration controller frequency (and accordingly the acceleration controlling ramp) is close to the cruise controller frequency. Accordingly, a reference signal $K_{ref}$ is generated having a value that is nearly equal in magnitude to, but somewhat less than, the high-speed $E_{oh}$ (FIG. 11). The reference signal is fed through relay contacts K7-1 as a first input to a comparator 180. A second input to comparator 180 is the acceleration ramp signal $E_{ra}$ (although this signal may also be the acceleration controller speed control signal $E_a$). When the acceleration ramp signal has a magnitude that exceeds the reference, the comparator provides an output to energize relay coil K6 and thereby close relay contacts K6-1 that are connected to initiate the synchronization operation. Contacts K6-1 may be provided in series between the reference input to the acceleration controller and the particular phase synchronizer output thereto. (These contacts are shown schematically in FIG. 5 as switches in the path of the signal flowing from the synchronizer to the controller.)

The comparison is initiated (when the acceleration ramp starts) by the output of a flip-flop 181 that is set by the signal that actuates the acceleration start ramp relay coil K5. Flip-flop 181, when set, energizes relay coil K7 to thereby feed the reference signal to the comparator at the start of the acceleration ramp. Flip-flop 181 is reset, to terminate the feeding of a synchronizing signal to the acceleration controller, by the output of an AND gate 182. The latter has a first input from the synchronization complete signal of the phase synchronizing circuit and a second input from an appropriate proximity switch, indicating that the train is completely out of the acceleration zone. Thus, the acceleration controller may be switched back for synchronization to a low-speed controller.

The arrangement illustrated in FIG. 21 is equally applicable to the deceleration controllers except, of course, that the reference applied to the comparator will have a magnitude slightly greater than the lowest magnitude of the deceleration ramp voltage $E_{rd}$ (FIG. 12.) Accordingly, synchronization of the deceleration controller with a low-speed controller will begin just before the terminal speed of the deceleration is achieved. Upon completion of the synchronization and when the train is out of the deceleration zone, synchronization of the deceleration controller with the low-speed controller is disabled and concamitantly, or with a short delay, a relay coil comparable to K6 for the deceleration controller is de-energized. This will close appropriate relay contacts (not shown in FIG. 21) that feed the appropriate high-speed reference signal for synchronization of the deceleration controller or, in the case of acceleration, to feed the appropriate low-speed reference signal for synchronization of the acceleration controller. When acceleration is initiated, synchronization of the acceleration controller with its adjacent low-speed controller is immediately disabled. Similarly, when deceleration is initiated, synchronization of the deceleration controller from its associated high-speed cruise controller is disabled.

Synchronization of the acceleration controller 59 (FIG. 5) with the low-speed controller 61 is achieved by frequency and phase synchronizing circuit 65c (FIG. 5) that receives digital output signals from the sequence logic circuits of the two controllers that are being compared. The synchronizing circuit 65c provides an error signal that is fed to the acceleration controller to vary its phase and achieve synchronization. This synchronization of the acceleration controller to the low-speed controller is initiated immediately after the acceleration has been completed. Synchronizing circuit 65b, as are all of the synchronizing circuits referred to herein, is of the type described in the above-identified application of Daniel F. Schaefer.

Similarly, when the ramp signal $E_{ra}$ reaches or nearly reaches the high fixed-voltage, the acceleration controller is synchronized in phase and frequency with the high-speed cruise controller 55b that drives the thruster modules of the following high-speed cruise zone. Thus a second phase and frequency synchronizing circuit 65d receives digital signals from both the acceleration controller 59 and the high-speed cruise controller 55b and compares these two to derive a frequency and phase error signal that is again fed to modify the phase and frequency of the acceleration controller 59 for synchronization with the high-speed controller phase and frequency.

As employed in the disclosed system (except in and about the station), the lengths of the acceleration and decelerations zones are determined after the slope of the velocity changing ramp has been selected in the light of passenger comfort and convenience of operation. Speed changes should be sufficiently rapid to avoid unnecessary delay, but must not be so rapid as to result in passenger discomfort for a people-moving system. Of course, the speed change rate must at all times remain within limits determined by the magnitude of available thrust.

The above-described operation of acceleration from low-speed to high-speed cruise zones is substantially similar to the operation of deceleration from high-speed to low-speed cruise zones, with the deceleration controller initially receiving a high-speed control signal, thereafter receiving a decreasing ramp, and then being clamped to the low fixed-voltage low-speed control signal. Synchronization of phase and frequency of the deceleration controller, first to the high-speed controller and thereafter, upon termination of the deceleration, to the low-speed controller, is also accomplished together with the recycling of the decleration controller to a high-frequency standby status wherein it will be ready to accept the following train from the high-speed zone.

Although the deceleration ramp may be provided by the same circuitry employed for acceleration ramp generation illustrated in FIG. 11, it is found convenient to use a capacitor circuit as illustrated in FIG. 12. A velocity controlling signal $E_d$ is fed to the deceleration controller 57 of FIG. 5. Signal $E_d$ is provided either as a fixed relatively high-voltage signal $E_{oh}$ or a deceleration ramp signal $E_{rd}$ in the form of an analog voltage that decreases in magnitude down to and is clamped to a relatively low-magnitude voltage signal $E_{os}$. The ramp signal $E_{rd}$ is generated at the output of capacitor 160 that discharges via a transistor 161 and a selected one of a group of slope defining resistors 162 and 163. One or the other of the resistors is chosen by selectively closing relay contacts K9-1 or K10-1. Although but two resistors are shown, it will be readily appreciated that a greater number of selectable resistors may be employed in parallel with those illustrated so as to provide a larger number of individually selectable deceleration slopes. A value of high voltage is selected by the operator via a selection control 164 to provide the high-voltage signal $E_{oh}$ that is fed to an amplifier 165.

When a relay coil K8 is de-energized, contacts K8-1 and K8-2 that are activated thereby are in the position shown in FIG. 12 so that a signal $E_{oh}$ from a high-speed selector 164 is passed through the amplifier 165 and through the normally closed contacts K8-1 to be fed as the signal $E_d$ to the deceleration controller.

Relay coil K8 remains de-energized when the train is operating at high cruise speed and the deceleration controller is synchronized with the adjacent zone high-speed controller, awaiting the next train. Relay coil K8 is energized when commencement of deceleration is signaled. Both the operator-selected low speed $E_{os}$ and the ramp signal $E_{rd}$ from capacitor 160 are fed to one side of contacts K8-1. Accordingly, when relay K8 is energized, contacts K8-1 open and contacts K8-2 close, the latter operating to ground the output of amplifier 165. In this condition, the output signal $E_d$ follows the ramp signal $E_{rd}$ until the latter reaches the level of the low-speed signal $E_{os}$, at which level it is clamped via a diode 167.

When the deceleration has been completed, the deceleration controller is synchronized to the low-speed controller, and the train is then propelled by modules under control of the low-speed controller. Relay K8 is de-energized, whereby the grounding of the output of amplifier 165 is removed, the high-voltage signal $E_{oh}$ is once again passed through contacts K8-1 and the signal $E_d$ that is fed to the deceleration controller rapidly returns to its high-voltage level.

SYSTEM OPERATION

Normal operation consists of start-up, continuous cycling, and shutdown. Under normal conditions of start-up, the trains are bumper-to-bumper in the station and the grouped train start procedure described below is employed.

A normal continuous cycling operation involves trains positioned bumper-to-bumper (within three inches of one another) in the station and dispatched at fixed time intervals, as determined by station speed. Station speed is selected by the operator as a function of the number of trains in operation. When a train in the station arrives at an acceleration point, such as point 23 of FIG. 1, it automatically begins to accelerate (by means of control logic described in detail hereinafter) until it reaches the speed of the following zone. Certain acceleration modules are either inhibited or switched between controllers, as will be more particularly described below. Fundamentally, however, phase and frequency of the station exit acceleration controller are synchronized with phase and frequency of the controller of the following zone, which may then receive the approaching train. When the train passes a proximity switch indicating that it is completely out of the acceleration zone, the acceleration controller rapidly recycles to the low frequency corresponding to the speed of the next train in the station. The acceleration controller is again synchronized in frequency and phase with the station frequency and phase, locking it to the station controller.

The first train continues through the fixed-speed zone to point 25 of FIG. 1. When the train passes a proximity switch indicating that it is completely within the deceleration zone, between points 25 and 26, a signal is generated to command the deceleration controller to initiate its decreasing frequency ramp and the train begins to decelerate. After the train has been decelerated, and the deceleration controller is synchronized in phase and frequency to the phase and frequency of the controller of the following zone, it continues on its way under power of the controller of the following zone. Thereupon, the deceleration controller for the zone between points 25 and 26 recycles to synchronize with the controller of the zone between points 23 and 25. This operation of speed change through the several acceleration and deceleration zones throughout the exemplary track illustrated in FIG. 1 continues until the train arrives at the station entrance at point 20.

STATION ENTRANCE DECELERATION

GENERAL DESCRIPTION

In and about the station entrance, thruster modules and the controls therefor are provided for decelerating an incoming train at an appropriate location to allow it to travel through the station at the selected spacing of the trains during station travel. This spacing is within three inches of the preceding train in the described embodiment. The system is arranged to automatically adjust for a relatively late or relatively early incoming train, throughout a range of spacing between the incoming train and the preceding train from one-half to double the normal spacing. Accordingly, the system will accommodate an extra train between two normally spaced trains, or a vacancy created by the removal of a train, and variations of spacing between these limits.

Figure 13:
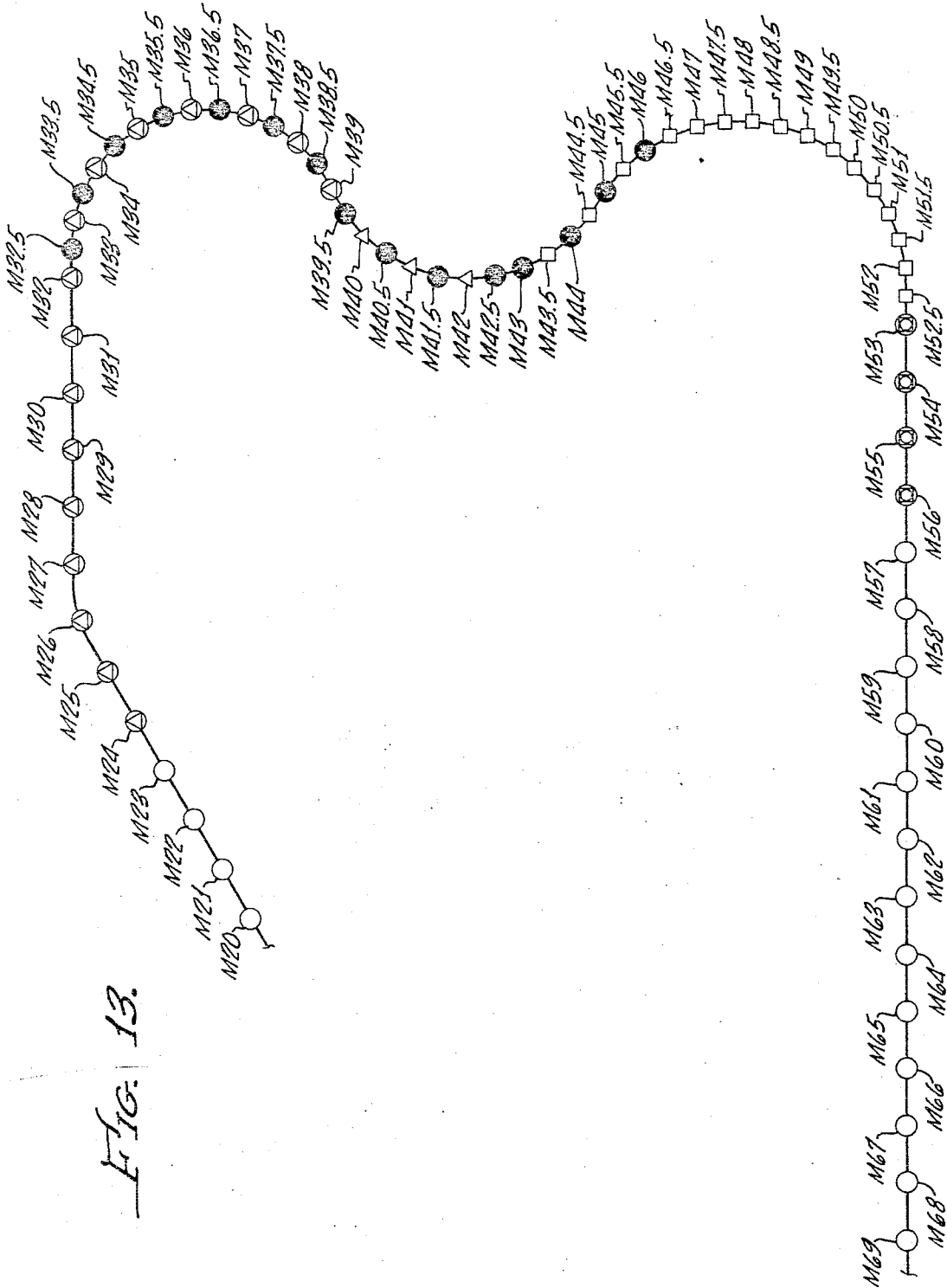
FIG. 13 illustrates an arrangement of thruster modules within and about the station.

As illustrated in FIG. 13, the modules in and about the station include a group of station approach cruise modules M20 through M23, all under control of a station approach cruise controller, such as for example the cruise controller 55a of FIG. 5. At this point, it may be noted that the arrangement of FIG. 5 is generally applicable to various cruise and speed changing operations both outside the station and within the station, but certain features shown in FIG. 5, and yet to be described, are employed solely for station operation as will become apparent as the description proceeds.

The station entrance deceleration zone is not a fixed zone, but is shiftable and includes four groups of cruise deceleration modules bearing the whole number of designations M24 through and including M39 of FIG. 13. These modules are alternatively driven by the cruise controller 55a or the deceleration controller 57 via the switching device 64 (FIG. 5). Signals HD-1, HD-2, HD-3 and HD-4 individually operate four switches of the switching device 64 so as to separately and individually enable the alternative control of different subgroups of the cruise deceleration modules from the cruise or deceleration controllers. The switches are controlled so that the train may be decelerated as it is propelled by all or only some of the subgroups of cruise deceleration modules. The switch under control of signal HD-1 controls the subgroup of cruise deceleration modules M24-M27; that under control of HD-2, the subgroup M28-M31; that under control of HD-3, the subgroup M32-M35; and that under control HD-4, the subgroup M36-M39. Modules M40, M41 and M42 are always under control of the deceleration controller.

Interdigitated with the whole-number modules M32–M42 are station modules designated by half numbers, including those modules indicated at M32.5–M42.5

For station exit acceleration, there is provided a number of acceleration modules, including interdigitated modules designated by the half numbers M43.5–M46.5, and the additional acceleration modules M47 through and including M52.5, all of the latter group having the closer spacing of interdigitated modules. Interdigitated with the acceleration modules M43.5–M46.5 are the final group of station modules designated by whole numbers M43, M44, M45 and M46. For a station of greater length than that shown in this exemplary embodiment, additional station modules are interposed between station modules M42.5 and M43.

Where the exiting train is to be accelerated to a relatively high speed, a group of convertible cruise acceleration modules M53 through M56 inclusive is provided that are operable either from the acceleration controller 59 (together with the acceleration modules at the station exit) or from the cruise controller 55$b$ (FIG. 5) by means of switch 64$a$ that is operated by the signal HA as derived from logic to be described hereinafter. The station exit acceleration terminates when the train is over the following cruise controlled modules, such as M57, M58, etc.

In relating FIG. 5 to FIG. 13, modules M20–M23 correspond to the high-speed cruise modules 54$a$ of FIG. 5. Cruise deceleration modules M24–M39 of FIG. 13 correspond to the cruise deceleration modules of FIG. 5. Station modules M32.5–M42.5 of FIG. 13 and the station modules M43–M46 of FIG. 3 correspond to the acceleration modules 60 of FIG. 5. Cruise acceleration modules M53–M56 of FIG. 13 correspond to the cruise acceleration modules 62 of FIG. 5, and modules M57, M58, etc., correspond to the high-speed cruise modules 54$c$ of FIG. 5.

Except for station modules M35.5, M36.5, M37.5 and M38.5, which are self-latching as previously described, all of the modules in the station, starting with module M34, are nonlatching and will remain activated only as long as their respective proximity switches are within the influence of a train. Similarly, because of the station logic control and relatively slower station speed, no interthruster logic (such as field ahead turn-on and N-6 turn-off shown in FIG. 8) is employed for these modules.

Train spacing at station entrance is sensed by one of a number of pairs of reed switches (see FIG. 4). The assemblies of reed switches are positioned in end-to end relation for a suitable distance in and about the station entrance, covering the track between modules M28 and M47. The switches are electrically connected in pairs of series-connected switches so that, when both switches of any one pair are closed, an appropriate position signal is generated. Although each switch is spaced at three inches from an adjacent switch, the switches of each pair of electrically connected switches are spaced from each other by approximately 56 feet. Accordingly, with the exemplary 33-foot trains, a desired spacing between two trains will exist, and deceleration of the following train may be initiated when the front of a train within the station is over one switch of an electrically interconnected pair and, concurrently, the front of the following train is over the rearward switch of such interconnected pair. It will be seen that this spacing between a preceding train and an incoming train may occur and will be signaled at any train position within the track length effectively covered by the reed switches. When such spacing is indicated by the closing of both switches of one pair of electrically connected reed switches, the incoming train is thereafter propelled by thrusters under control of a deceleration controller, whether this incoming train at such an instant is within the station (as would occur if a train had been inserted between two normally spaced trains) or further out from the station (as would occur when a train has been removed and the inter-train spacing during cruise is relatively large). Alternatively, these thrusters are operable from a cruise speed controller.

In the interdigitation of the thruster modules, alternate modules, such as M40, M41 and M42, are mutually spaced at the previously described 6.6 feet center-to-center spacing. Thus, the center-to-center spacing of adjacent interdigitated modules is halved (3.3 feet).

The station modules are controlled by station controllers. Therefore, in certain positions of travel, the trail will be over groups of interdigitated modules, of which one group will be under control of a deceleration controller, for example, and the other group will be under control of a station controller. During such travel, the modules of one or the other of the controllers are inhibited by the logic to be described hereinafter.

When a command to decelerate is initiated by operation of one pair of reed switches (or by other logic when no earlier train is in the station entrance), some or all of the four groups of cruise deceleration thruster modules (these groups being designated as HD-1, HD-2, HD-3 or HD-4) are switched to come under control of a deceleration controller. The number of such groups that is switched to deceleration depends upon the position of the incoming train (as determined by an actuated proximity switch) when a pair of reed switches is actuated. Thus, both the reed switches and proximity switches participate in the station entrance deceleration logic. The reed switches signal when the predetermined spacing exists, and the proximity switch signal, when combined with the reed switch signal, senses whether a relatively large or small (as compared to nominal) spacing of the cruising train exists. More of the cruise deceleration modules are switched to deceleration control when such cruise spacing is relatively small, and fewer are switched when such cruise spacing is relatively large. All of the cruise deceleration modules under the train and also all of the cruise deceleration modules forward of the train are switched to the deceleration controller. All cruise deceleration modules behind the incoming train remain under control of the cruise controller. As the train is decelerated and reaches certain proximity switches, some of the cruise deceleration thruster modules are no longer needed and the groups HD-1, HD-2, HD-3, etc., are returned to control of the fixed-speed cruise controller.

DECELERATION LOGIC

The logic employed in the exemplary system embodies conventional elements which are illustrated in the drawings by conventional symbols as comprising flip-flops, AND gates, OR gates, NAND gates, and NOR gates. In the symbology employed herein, each flip-flop is provided with a "set" input S, a "reset" input R and a pair of outputs labeled Q and $\overline{Q}$. A "reset" input labeled $R_d$ is also provided for each flip-flop. Positive five volts is true, high or logical one and zero volts is false, low or logical zero. A one at input S of each flip-flop places the device in its set or true state wherein Q is +5 volts (logical 1) and $\overline{Q}$ is 0 volts (logical 0). When a true input of five volts is applied to either or both of the reset inputs R and $R_d$, the flip-flop is placed in its reset or false state wherein Q is low and $\overline{Q}$ is high.

Conventionally, the flip-flop remains in any given state (set or reset) unless and until it is shifted to the other state by an appropriate true input.

The AND gate provides a true output if and only if both of its inputs are true. The OR gate provides a true output if either or both of its inputs are true. The NAND gate provides a false output when and only when both of its inputs are true. The NOR gate provides a true output when and only when both of its inputs are false. These gates, accordingly, may be used as inverters.

Figure 14:
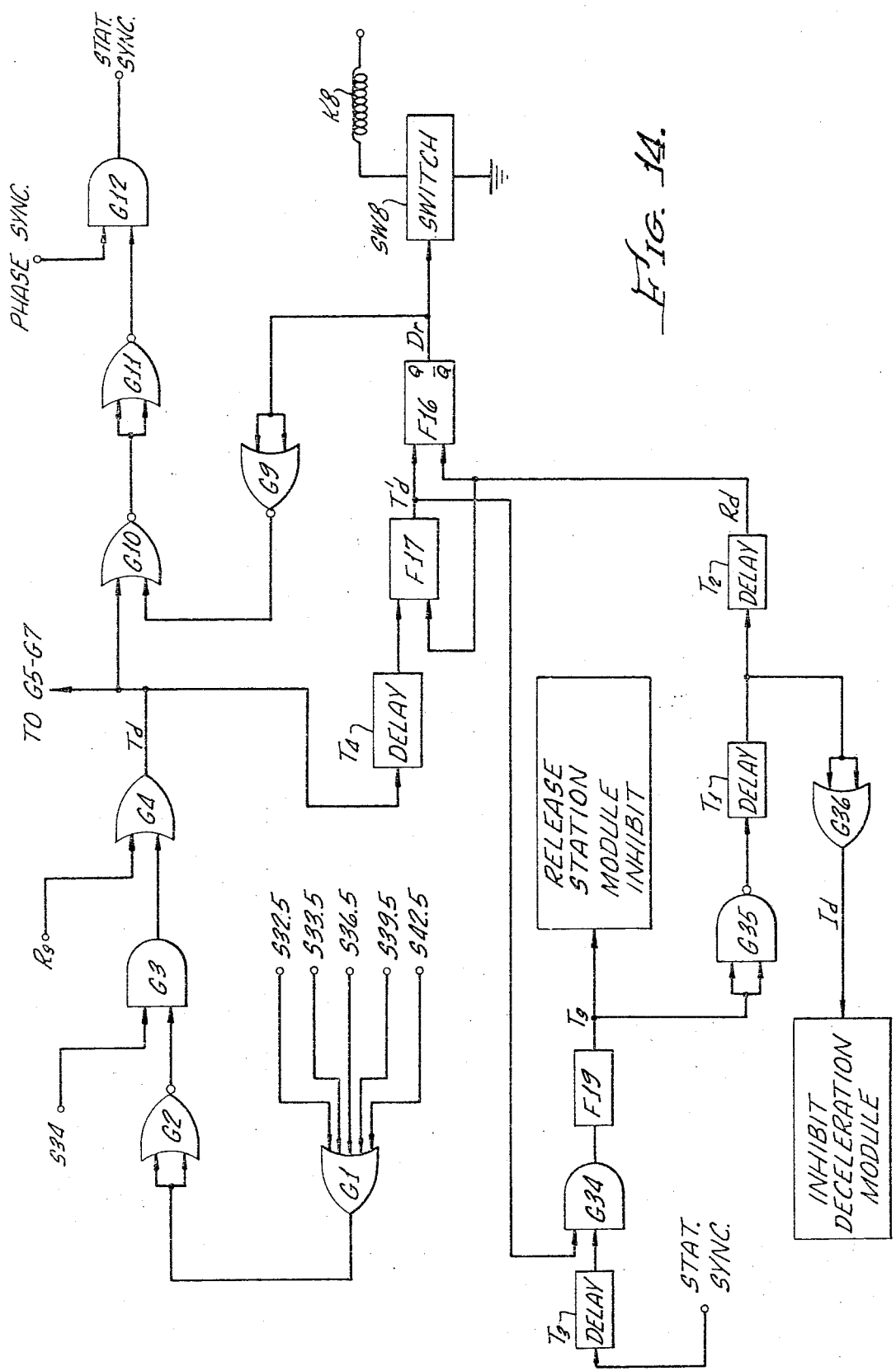
FIGS. 14, 15, 16 and 17 illustrate station deceleration logic.

Referring now to the station entrance deceleration logic illustrated in FIG. 14, the arrangement is such as to respond to the occurrence of the selected spacing between a train already in the station and an entering train that is to be decelerated to provide the deceleration trigger signal $T_d$ indicating "time to decelerate." Signal $T_d$ is provided with the switches of one pair of the many paralleled pairs of reed switches are both operated. It is noted that, according to the symbology employed herein, each proximity switch output signal is indicated by the letter S followed by the number that identifies the specific thruster module, so that the signal S27 indicates the output of proximity switch of module M27 and the symbol S33 indicates the output of the proximity switch of module M33, etc. The proximity switch signals are, in effect, position signals that indicate position of the train.

Should a train approach the station when there is no train already in the station (or when the preceding train is far into a long station), the generation of the deceleration trigger signal $T_d$ cannot be accomplished by the reed switches since the latter depend upon spacing between two trains. Accordingly, the output of the proximity switches of modules M32.5, M33.5, M36.5, and M39.5 are all fed to an OR gate G1 which provides an output from an inverting gate G2 that is logical one when no train is over any one of the indicated station modules. In such a case, deceleration of an incoming train is chosen to be triggered when it activates module M34 (FIG. 13). In effect, this arrangement senses when the preceding train (if any) is far ahead of the incoming train, the spacing being greater than a distance that allows deceleration to start well into the station. Accordingly, the output of the inverter is combined with the signal S34 in an AND gate G3 and provided as a second input to an OR gate G4. The latter has the reed switch signal $R_s$ as its first input. Thus, the signal $T_d$ is produced at the output of G4 either when the proper spacing is sensed or when the incoming train triggers the proximity switch of module M34 if no train is already in the station. The signal $T_d$ operates the switching device 64 of FIG. 5 so as to switch the appropriate groups of cruise deceleration modules to the deceleration controller. Logic of these switches is shown in FIG. 15.

Figure 15:
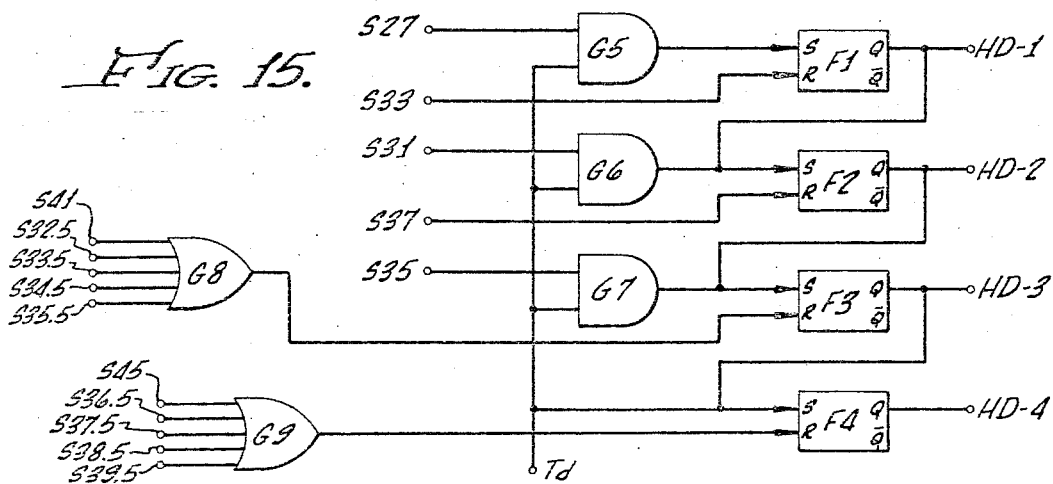

If the proper spacing has been sensed to generate the signal $T_d$ and the incoming train actuates the proximity switch of module 27, both inputs to AND gate G5 of FIG. 15 are true to provide a true input to set flip-flop F1. A one output of F1 is the signal HD-1 that is fed to one switch of switching device 64 (FIG. 5) that selectively connects modules M24-M27 to either deceleration controller 57 of FIG. 5 or cruise controller 55a. When the Q output of F1 is one, the HD-1 modules are powered from the deceleration controller. When such output is zero, these modules are powered from the cruise controller. A reset input is applied to F1 in the form of a signal S33 from the proximity switch of module M33 to allow the HD-1 modules to be again powered from the cruise controller when the incoming train has reached module M33.

A second flip-flop F2 has its output connected to operate the switch that selectively directs power to the HD-2 modules from either the cruise or deceleration controller. Again, when the Q output of F2 is true, the modules controlled thereby are connected to and powered from the deceleration controller. F2 is set when the reed switches provide the $T_d$ signal together with an output from the proximity switch of module M31. In other words, if the incoming train has progressed to module M31 when the deceleration trigger signal occurs, the modules of the group HD-1 are not needed for the deceleration. Therefore, F1 will remain in its initial reset state, holding modules HD-1 under control of the cruise controller. However, as previously indicated, if any of the earlier groups of cruise deceleration modules is switched to the deceleration controller, all of the following groups are likewise switched. To this end, the one output of F1 is provided as a second input to the set input terminal S of F2. Accordingly, the latter may be set to true state either when F1 is one or when the output of gate G6 is one.

When the incoming decelerating train has reached module M37, it will be at station speed, wherefore the HD-2 thruster modules may be returned to the cruise controller by the reset input S37 to F2.

Flip-flop F3 has an output which, when one, will cause the HD-3 group of modules to be powered from the deceleration controller. The normally reset flip-flop F3 may be set either when the output of the preceding flip-flop F2 is one, or upon occurrence of both the deceleration trigger signal $T_d$ and the actuation of proximity switch of module M35, providing inputs to an AND gate G6 that has its output connected to the set input terminal of F3. The set terminal of F3 is also connected to the Q output of the preceding flip-flop F2.

When deceleration is triggered via gate G7 at the set input of F3 from the deceleration signal $T_d$ and the proximity switch signal S35, the deceleration will have been completed by the time the fromt of the decelerating train reaches module M41. In this case, the signal S41 from the proximity switch of this module is employed as an input to reset F3 and allow the group of thruster modules HD-3 to be returned to the cruise controller. Alternatively, F3 is reset via OR gate G7 by any one of S32.5, S33.5, S34.5, S35.5.

The fourth flip-flop provides a one input which will switch the group of thruster modules HD-4 to the deceleration controller. F4 is also normally in reset state and will be set by an occurrence of the deceleration trigger signal or it may be set by the setting of the preceding F3 flip-flop. The group of modules switched to deceleration by F4 is always switched by $T_d$, regardless of when $T_d$ occurs. The F4 flip-flop is reset when the decelerating train triggers the proximity switch of module M45. Alternatively, flip-flop F4 is reset by an output of the proximity switch of any one of thruster modules M36.5, M37.5, M38.5 or M39.5. The additional resetting of F3 and F4 by the station module activation signals S32.5–S39.5 is provided because, once the train is driven by the station modules, the deceleration modules are no longer needed for this train. The station modules are inhibited until deceleration is completed, as described below.

In addition to enabling flip-flops F1–F4 of FIG. 15, the signal $T_d$ is delayed in a delay circuit T4 (FIG. 14) and applied to the set input of a flip-flop F17. When set, this flip-flop produces the delayed signal $T'_d$ which is fed to a set input of flip-flop F16. When set, the latter provides the signal $D_r$ which indicates the deceleration ramp may be initiated. Signal $D_r$ is logical zero when F16 is set by the $T_d$ signal. $D_r$ is inverted in a gate G9 and fed together with the signal $T_d$ from OR gate G4 to a NOR gate G10 and thence to an inverter G11. The output of inverter G11 is logical one, indicating that train spacing allows the deceleration ramp to be started, and is combined in an AND gate G-12 with the phase synchronizing signal (phase sync complete) from the frequency and phase synchronizing circuitry which then signals when synchronization of the two controllers being compared has been achieved. The output of AND gate G12 is accordingly logical one to provide a station synchronization signal indicating that deceleration has been completed and the deceleration controller has achieved synchronization with the station controller.

When synchronization with the station controller has been achieved, appropriate action may be commenced to remove the inhibit of all of the station modules. The station modules had been inhibited when any adjacent module (on either side) was activated.

Figure 16:
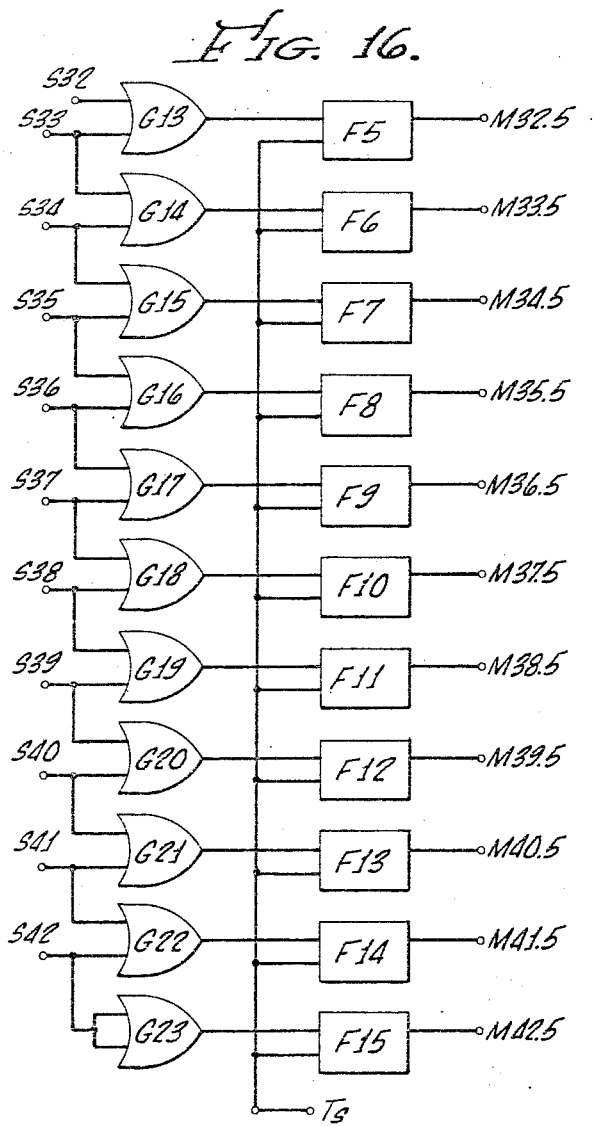

As indicated in FIG. 16, the station modules M32.5–M42.5 are inhibited by the setting of flip-flops F5-15. The Q outputs of these flip-flops are respectively applied to the indicated station modules to inhibit these when the flip-flop is set. For station modules M32.5 through and including M41.5, these station module inhibiting flip-flops F5-F14 are each set by the output of one of the OR gates G13–G22 having inputs from the proximity switches of the two modules immediately on either side of the particular station module. Station module M42.5 is inhibited only by the preceding deceleration module M42. When the deceleration controller is synchronized with the station controller, a $T_s$ signal is generated, as described below, to reset each of the flip-flops F5–F15, thus releasing the inhibit of the station modules and allowing the convertible cruise deceleration module groups HD-3 and HD-4 to be switched back to the cruise controller by the logic shown in FIG. 15.

Figure 17:
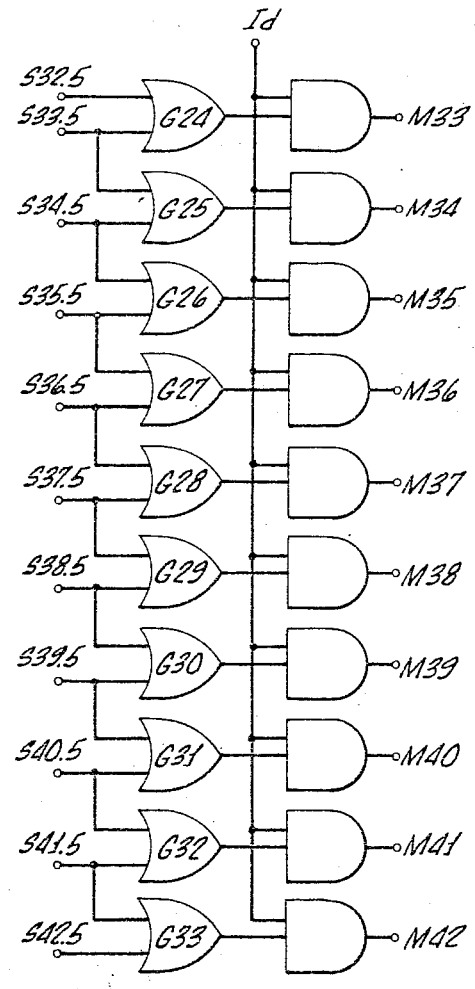

Since certain of the cruise deceleration modules and the deceleration modules M40, M41 and M42 may be under a train that has already been decelerated to station speed and which is under thrust of the station thruster modules, these cruise deceleration and deceleration modules are inhibited to allow them to be switched back to the cruise controller and to avoid the influence of the deceleration modules on the train that is being controlled by the station modules. Accordingly, as shown in FIG. 17, an inhibit signal is fed to each of the deceleration modules M33–M42 via a group of AND gates each having a first input from a respective one of OR gates G24–G33. The latter have inputs from the proximity switches of the station modules on either side of the particular deceleration modules. A second input to all of the AND gates that are fed from OR gates G24–G33 is an inhibit signal $I_d$ that is generated by logic shown in FIG. 14 and described below. Each of these AND gates has an output to a respective one of the modules M33–M42, as shown in FIG. 17. Such output is logical one when both of the gate inputs are logical one, whereby the module is inhibited by activation of a station module on either side thereof together with the signal $I_d$.

Referring once again to FIG. 14, the station sync signal appearing at the output of AND gate G12 is delayed in a circuit T3 and fed as one input to an AND gate G34. The other input to this AND gate is signal $T'_d$ which is one when F17 is set. Thus, a one input is fed to set a flip-flop F19 when the delayed deceleration trigger signal $T'_d$ exists a time T3 has elapsed since occurrence of station synchronization. Flip-flop F19, when set, provides the signal $T_s$ that is fed, as shown in FIG. 16, to reset flip-flops F5–F15 to thereby remove the inhibit on all of the station modules. Thus, this inhibit is removed when velocity imparted by the cruise deceleration thrusters equals station velocity.

The signal $T_s$ is also inverted in a gate G35 and fed to trigger an interval timer $T_1$. At the end of the interval determined by timer $T_1$, which may be in the order of one second for example, a signal is fed to initiate the timing of a second interval timer $T_2$. The signal at the end of the first interval $T_1$ is fed through a buffer gate G36 to provide signal $I_d$ which is fed to the gate circuits of FIG. 17 to enable inhibit of the deceleration modules M33–M42.

The inhibit logic (FIG. 17) for the deceleration modules is operated to effect the selective inhibition by station modules on either side only when $I_d$ is one. As the decelerating train reaches station speed and station synchronization is achieved, the train may be driven by either deceleration or station modules. Thus, for a few cycles there is an overlap and the train is driven by both. During this time, $I_d$ is logical zero and the deceleration modules cannot be inhibited. When $T_1$ (FIG. 14) times out, or when station synchronization does not exist, $I_d$ is one to enable inhibit of the deceleration modules by station modules on either side.

When the second interval timer $T_2$ times out, it produces a signal $R_d$ which is fed to reset both flip-flops F16 and F17 to thereby change the signal $D_r$ from zero to one. When the signal $D_r$ is zero, that is when flip-flop F16 is set, a switch SW8 is closed to energize relay coil K8. Energization of coil K8 operates contacts K8-1 and K8-2 to feed the deceleration ramp signal $E_{rd}$ to the deceleration controller, as described more particularly in connection with the deceleration circuitry of FIG. 12. When the signal $D_r$ is one (with the flip-flop F16 in reset condition), switch SW8 is opened to de-energize relay coil K8, whereupon the high-speed cruise signal $E_{oh}$ is fed to the deceleration controller from the deceleration ramp generator of FIG. 12. The train, having been decelerated, now travels through the station under control of station modules, and the deceleration controller is recycled in preparation for the next incoming train

STATION EXIT ACCELERATION:
GENERAL DESCRIPTION

In order to provide for exit acceleration of the leading one of several trains that are traveling bumper-to-bumper within the station, or of any single train traveling alone within the station, a plurality of thruster modules M43.5, M44.5, M45.5 and M46.5 is interdigitated between station modules M43, M44, M45 and M46. The station modules are controlled by the station controller and the acceleration modules are under control of an acceleration controller. In addition to the acceleration controlled thruster modules identified above, additional closely spaced (at the previously described interdigitated spacing) thruster modules M47–M52.5 are provided at the station exit, as previously described and illustrated in FIG. 13. Following acceleration thruster modules M52.5 at the closer interdigitated spacing, but mutually spaced from each other at the regular 6.6 feet center-to-center spacing, are the group of cruise acceleration thruster modules M53, M54, M55 and M56 which are alternatively driven from an acceleration controller or a fixed cruise-speed controller.

The start of acceleration is signaled by actuation of a proximity switch on module M47 which turns on (releases the inhibit) the acceleration modules under the train. Up to this time, these modules where inhibited by the station modules. When the proximity switch of module M47.5 is actuated, the preceding station under the train to be accelerated are inhibited. Over the next module, when the proximity switch of M48 is actuated, the acceleration ramp is started and the acceleration controller drives all of the acceleration modules and the accelerating train at increasing velocity.

When the accelerated train is under cruise control, acceleration modules M46.5–M52.5 may be inhibited and their controller swept back to synchronism with the station controller so as to be ready to accept the next train.

ACCELERATION LOGIC

Figure 19:
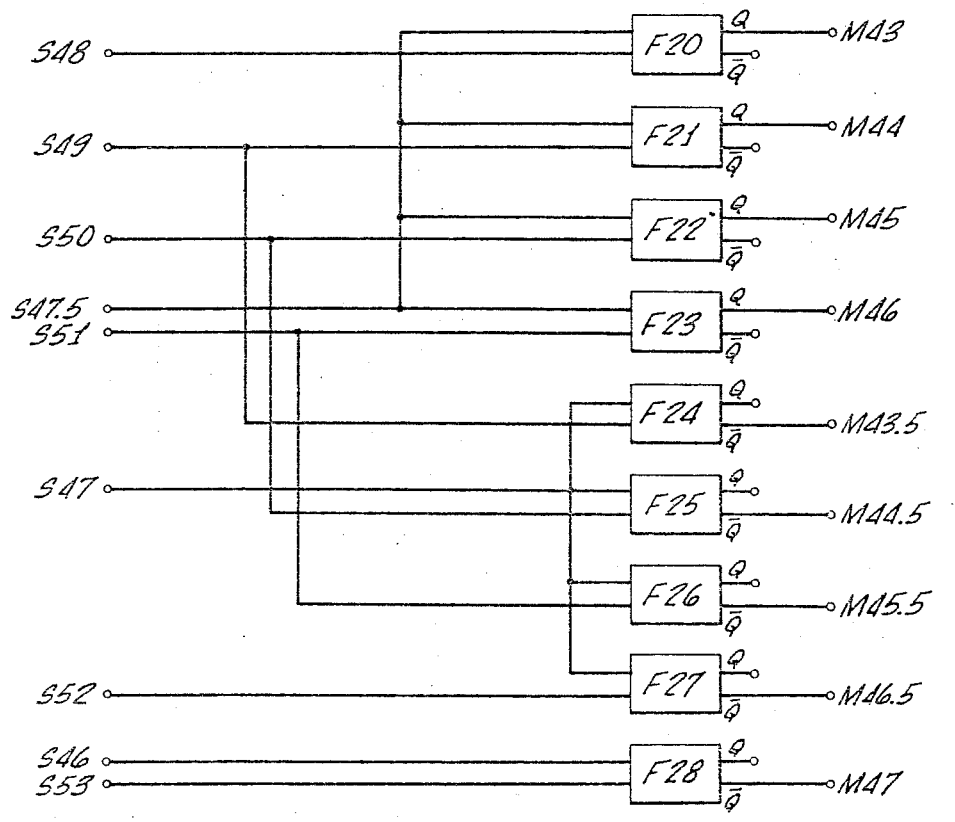

Initiation of the exit acceleration procedure occurs when a train activates the proximity switch of module M47. At this time, the train is traveling at station speed. Acceleration modules M43.5, M44.5, M45.5 and M46.5–M52.5 are all on the acceleration controller which is synchronized with the station controller. Cruise acceleration modules M53–M56 are on the acceleration controller. M43.5, M44.5, M45.5 and M46.5 are inhibited by the $\overline{Q} = 1$ output of flip-flops F24–F27 which are all reset at this time (FIG. 19). Upon occurrence of the signal S47 from the proximity switch of acceleration module M47, a signal is fed to release the inhibit of acceleration modules M43.5, M44.5, M45.5 and M46.5 by means of the indicated $\overline{Q}$ output of flip-flops F24, F25, F26 and F27. Each flip-flop is set by S47 to make $\overline{Q} = 0$. The inhibition of acceleration module M47 is released by actuation of the proximity switch of module M46 to provide the signal S46 that sets flip-flop F28 to provide the $\overline{Q}$ output of zero.

Station modules M43, M44, M45 and M46 are inhibited when the Q output of flip-flops F20, F21, F22 and F23, respectively, (FIG. 19) are each logical one. These station modules are inhibited when the exiting train triggers the proximity switch of the next module M47.5 to provide the signal S47.5 that is fed to set each of flip-flops F20–F23. These flip-flops are reset to thereby release the station module inhibit when the exiting train has progressed past the inhibited station module. Accordingly, when the exiting train triggers the switch of module M48, signal S48 resets flip-flop F20 to release the inhibit of station module M43. Similarly, the signals S49, S50 and S51 release the inhibit of station modules M44, M45 and M46 by resetting flip-flops F21, F22 and F23. S51 releases the inhibit of station module M46 and also, via flip-flop 26, releases the inhibit of acceleration module M45.5. Similarly, the inhibit of acceleration modules M46.5 and M47 is released by operation of modules M52 and M53.

Figure 18:
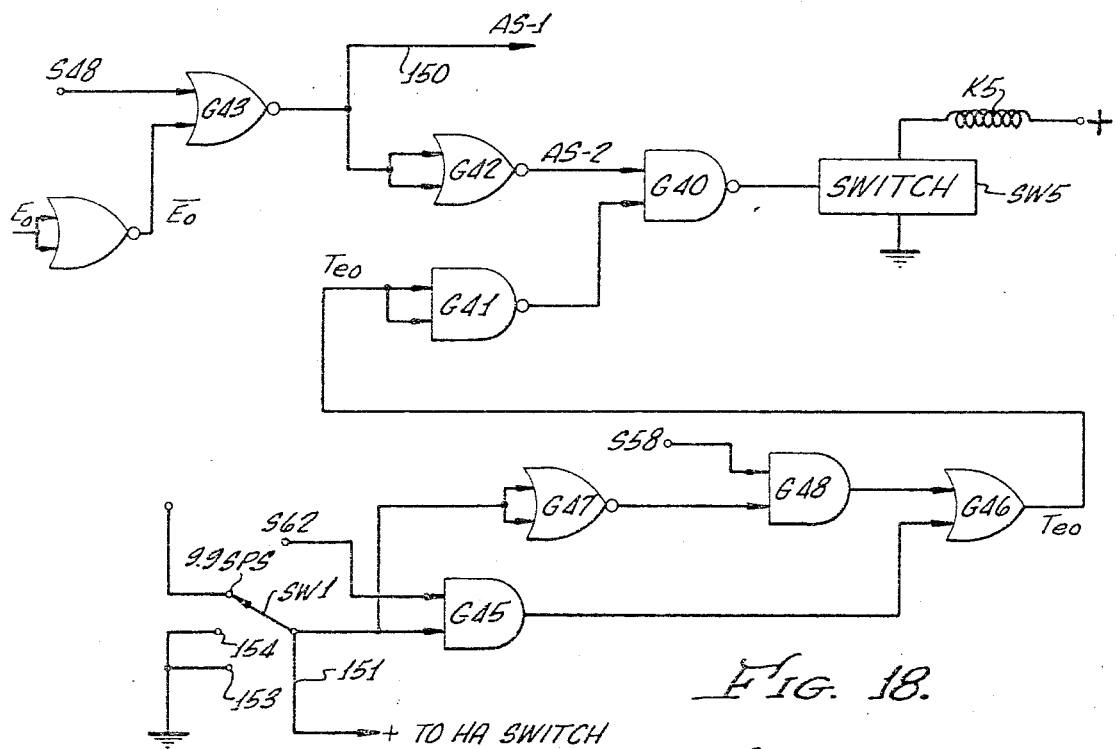
FIGS. 18 and 19 show the station acceleration logic.

Thus, the acceleration modules under the train to be accelerated have had their inhibit released and the station modules that are interdigitated with such acceleration modules are inhibited by the signal S47.5. Now the acceleration ramp that is fed to the acceleration controller may be initiated. This is achieved by energizing the relay coil K5 (FIG. 18) by closing a switch SW5. Switch Sw5 is closed when the output of NAND gate G40 is zero. Gate 40 provides a zero output when a signal AS-2 and a signal $T_{eo}$ are both one. The signal $T_{eo}$ is a logical one at the input to inverter Gate G41 when the preceding train has progressed a predetermined distance from the station, as will be described more particularly below.

The signal AS-2, provided via an inverter G42, indicates that the acceleration ramp may be started and the acceleration controller may be synchronized to the cruise controller upon completion of acceleration. This signal AS-2 is logical one at the input to G40 when the output of a NOR gate G43 is logical zero. The inputs to NOR gate G43 comprise the signal S48 from the proximity switch of module M48 and a signal $E_o$. The latter is the inverted signal provided from the amplifier 149 of acceleration ramp generator of FIG. 11. In effect, signal $E_o$ from amplifier 149 indicates the state of relay K5, since $E_o$ is logical zero when the relay is energized. Accordingly, if the relay K5 is energized (thus indicating the occurrence of the acceleration ramp), or if the proximity switch of module M48 is triggered, the output of NOR gate G43 (FIG. 18) is zero to provide a logical one output from inverter G42 indicating the condition that permits synchronization of the acceleration controller to the cruise controller. $E_o$ acts as a latching signal to hold the ramp. On the other hand, if and only if the acceleration ramp has been completed (with relay K5 de-energized) and, simultaneously, there is no train over module M48, the signal AS-2 is zero so as to prevent start of the acceleration ramp. If AS-2 is zero, a signal AS-1 on line 150 is logical one to thereby enable synchronization of the acceleration controller to the station controller. In general then, K5 is energized when S48 is logical one, is latched by $E_o$, and de-energized (train is out of the station) when $T_{eo}$ is logical one.

The signal AS-2 not only allows the acceleration ramp to start but it also switches (via switches shown in FIG. 5) the cruise controller reference frequency to the synchronizer so that the acceleration controller may be synchronized to the cruise controller at the end of the ramp. Similarly, the signal AS-1, which is one when relay K5 is de-energized (allowing the acceleration controller to rapidly sweep back frequency), switches station frequency),switches (via switches shown in FIG. 5) the reference frequency input to the synchronizer to allow synchronization of the acceleration controller with the station controller.

The point at which an exiting train must arrive before the acceleration controller can be switched back to synchronism with the station controller depends upon the magnitude of acceleration. For example, a train to be accelerated from the station to a cruise speed of 6.6 feet per second, or less, may have completed its acceleration when it reaches module M58, whereas a train accelerating to a higher speed, such as 9.9 feet per second for example, may not have completed its acceleration until it reaches module M62. Accordingly, a switch SW1 is provided that is set according to the speed of the cruise zone immediately outside the station. When in the illustrated position, the high speed, such as 9.9 feet per second, is selected and feeds the signal by a lead 151 to the switch 64a (FIG. 5) to put this in a position wherein the cruise acceleration modules M53, M54, M55 and M56 are under control of the acceleration controller. The signal from switch SW1 is fed to an AND gate G45 where it is combined with the signal S62 from module M62 indicating the exiting train has reached this module. The output of G45 is fed through an OR gate 46 to provide the signal $T_{eo}$ which, when logical one, indicates that the train is clear of acceleration modules. The latter, accordingly, may be switched back to synchronism with the station controller, which is achieved by the above-described logic that causes the signal AS-1 to be logical one and also de-energizes the acceleration ramp coil K5 by means of a zero input to NAND gate G40.

Where the accelerating train is to cruise at a lower speed, the switch SW1 is placed in a position to contact one of the terminals 153, 154, so that the output of gate G45 is zero. However, the logical zero now provided by the switch is inverted in a gate G47 and combined in an AND gate G48 with the signal S58 from module M58 to provide a logical one input to OR gate G46 when the train reaches module M58. Thus, at low speed, module M58 will signal that the train is out of the station.

When accelerating to the lower speed with the switch SW1 in a low-speed position, there is a logical zero signal via line 151 to the switch 64a whereby the cruise acceleration modules M53, M54, M55 and M56 remain under control of the cruise controller.

All trains may be stopped by the operator who depresses a "normal stop" switch (not shown) that will activate all controllers with a deceleration frequency ramp that brings the trains to a very low velocity, at which time all controllers are turned off to allow the trains to roll to a stop.

TRAIN ADDITION AND REMOVAL

The number of trains in service may be increased by adding trains to the main track via an incoming spur track 510, shown in FIG. 1. Since the spur track is relatively short and headway control is not a problem, conventional linear induction motors may be employed in mutually spaced intervals along the spur track 510 to drive the interdigitated rotor described above that is carried by all cars. If necessary, the operator may move a train or a group of trains synchronously from one zone to another on the main course by selectively inhibiting all modules except those over which is is desired to have the trains move. Thus, the operator has manual control to insure that the track adjacent the incoming spur 510 is clear when other trains are added.

Figure 20:
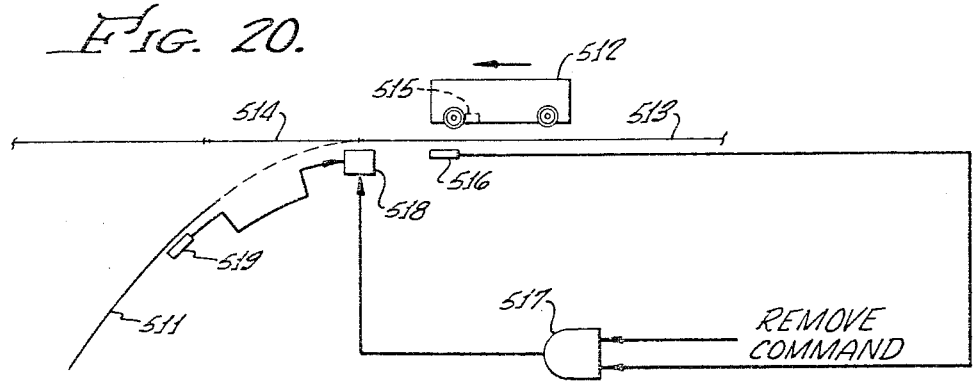
FIG. 20 illustrates track switch operation for train removal.

One or more trains may be automatically removed from the main track and sent toward an outgoing spur track 511, as illustrated in FIG. 1. The arrangement for automatic removal of a train is shown in FIG. 20, wherein a train 512 traveling on the main track 513 is to be switched to the spur track 511 via a track switch 514. All trains are provided with a "magnetic flag" in the form of a sensor actuator that may be located on the opposite side to the track, as compared with the magnetic actuator 48 in FIG. 3 that operates the reed switch. This actuator may be manually operated by operating personnel in the station who may observe a train that warrants removal because of damage, lack of cleanliness or other reason. Remote control of this actuator may be also or alternatively provided if deemed necessary or desirable. Thus, each train carries a magnetic "flag" 515 in the form of a movably mounted magnet that may be manually operated to a position wherein it will actuate a train removal sensor 516 placed adjacent the track some distance rearwardly of the begining of track switch 514.

To remove a train, the operator moves its magnetic sensor actuator from its normally disabled position to its operating position and sends a "remove train" command (arming) signal to an AND gate 517. When the train passes the sensor switch 516 a second input to AND gate 517 is generated to provide an output to a switch operator 518 to move track switch 514 to the position thereof illustrated in dotted lines. If deemed necessary or desirable, the output of AND gate 517 may also operate to disable all thruster modules positioned between sensor switch 516 and the track switch so that the train will coast into the spur, or at least enter at decreaed velocity. When the train has moved along the spur to a position fully clear of the track switch 514, its magnetic flag sensor actuator 515 actuates a second track switch sensor 519, which thereupon feeds a second signal to track switch actuator 518 to move the track switch back to its normal position illustrated in solid lines in FIG. 20.

An alarm may be provided in the form of a time delay (not shown) that senses occurrence of a track switch closing signal from sensor 519 a predetermined time after generation of the track switch opening signal from actuator 515. If the switch closing signal does not occur after the selected time interval, an alarm is sounded and the system may be shut down.

GROUP START

In the normal group start procedure, all trains are positioned in a bumper-to-bumper relation with the lead train to the rear of the point of acceleration from the station. The station controllers are driven with an increasing frequency to provide an acceleration of about 0.01g until the station speed is reached, which is arranged to occur when the lead train is at or nearly at the exit acceleration points. The trains are accelerated from the station at the proper interval and in such a manner that the first train out of the station will have returned to a bumper-to-bumper relation with the last train out of the station. When fewer trains are in use, longer dispatch intervals are achieved by employing slower station speed. Greater station speed is chosen to decrease dispatch interval for large numbers of trains in use.

VEHICLE MOUNTED THRUSTER

The system described above employs thruster modules fixed to the track. The moving vehicle carries only a passive rotor. The system has many advantages in different types of systems. Nevertheless, economic feasibility is greatest for high-density systems, that is, systems in which there is a relatively large number of vehicles per unit length of track. In such high-density systems, the relatively complex and expensive thruster modules are in use a large percentage of time. However, certain systems embody low-density operation wherein certain portions of track may have a relatively low percentage of use. Relatively long intervals occur between passage of successive vehicles. For such low-density systems, it may be more feasible, at least from the standpoint of economics, to employ the lower cost element on a fixed track, and the more costly complex components on the vehicle. Accordingly, for such a low-density system, the described linear synchronous motors may have the fixed and moving elements thereof reversed, with the stator element mounted on the underside of the vehicle and the rotor element mounted in the track. For such a system, a so-called "power rail" or "third rail" is employed to provide power to the onboard stator.

Figure 22:
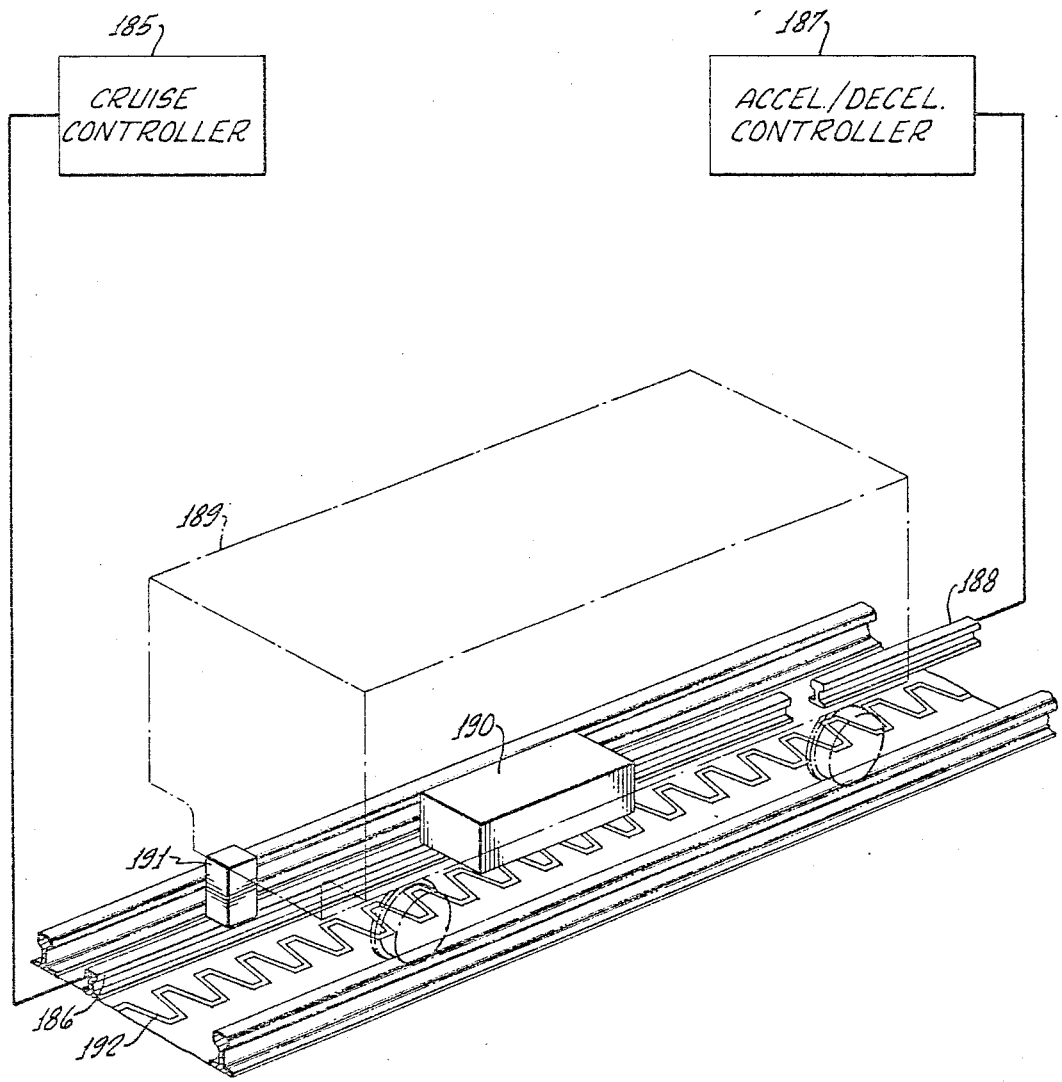
FIG. 22 illustrates a system having a track fixed rotor and vehicle mounted stators.

The moving stator, fixed-rotor system operates very much like the initially described fixed-stator, moving rotor system. The controller inverters in the moving stator, fixed-rotor system furnish power not to selected thruster modules, as in the previously described arrangement, but rather to selected sections of the power rail, or "third rail," which sections are, of course, mutually insulated. Thus, as shown in FIG. 22, a fixed speed or cruise controller 185 powers a third rail 186 throughout the cruise zone and an acceleration controller 187 powers a third rail 188 in the acceleration zone. A deceleration controller powers still another third rail section in a deceleration zone. A vehicle 189 now carries a stator 190 and a power rail pickup or brush 191 instead of a rotor. The rotor 192 is fixed in the track in operative relation to the passing stators and extends continuously or in closely spaced (by integral multiples of pole pitch) segments throughout the length of the track. The vehicle will move between fixed-speed and variable-speed zones only while the controllers of the two are synchronized in phase and frequency. The operation of the controllers, synchronization of one with another, and the handoff or transfer of a vehicle from one zone to another all controlled in the same manner as previously described. The sole difference is that the controller outputs are connected to selectively fixed sections of track (power rails) rather than to selectively fixed thruster modules on the track.

Deceleration into the station for headway correction in a moving stator, fixed-rotor system employes a segmented power rail instead of the previously described cruise deceleration thrusters. The segmented rail sections at station entrance are alternatively powered from a cruise controller or a deceleration controller, much the same as the cruise deceleration modules previously described are alternatively controlled.

A passive rotor of a fixed-rotor, moving stator system may comprise simply a group of magnetic steel bars embedded in concrete of the track in the above-described rotor configuration. A wound pole rotor may also be used.

COMBINED ELECTRICAL/MECHANICAL SYSTEM

Linear synchronous motors are particularly well suited for accelerating and decelerating vehicles and maintaining precise headway during such speed variations. Mechanical propulsion systems, on the other hand, may be more economical for fixed-speed sections. Such mechanical systems are of many well-known types and include continuously moving series or chains of drive elements. Concepts of the described linear motor system may be combined with a mechanical drive system for certain sections of track so that vehicles will be propelled by the linear motor system described above in certain portions of their path of travel and will be propelled by a mechanical system in other portions of their path. It is only necessary that such a mechanical system operate at a known speed (except when starting or stopping) and that the linear motor system be capable of being synchronized to such mechanical system speed for the handoff, or transfer, of the vehicle from the mechanical system to the linear motor system and vice versa.

As an example of such a combined system, the vehicle is towed through a fixed station by a low-speed mechanical drive system unitl it is positioned over linear motor thruster modules. At this point, the vehicles are driven by the thruster modules and accelerated as described above. The vehicle is then driven by the linear synchronous motor system to the next fixed-speed mechanical drive zone where, with proper speed synchronization, the vehicle is again picked up by the mechanical system and carried to the next linear motor acceleration or deceleration zone.

DIGITAL RAMP

Standard small-scale computers can be used to control the described systems and also to provide additional functions that will enhance operation. For example, with the availability of a computer, the analog speed controlling ramp voltages that feed acceleration and deceleration ramp signals to the inverters of the controllers may be replaced by a digital ramp that will inherently be in phase with the fixed frequencies at all times. This will eliminate need for any synchronizing circuitry. As an example of a digital ramp, one may provide a high-frequency master signal in the order of 900 killohertz, for example, which may be divided into a large number of different lower frequencies, all of which are synchronized with each other since they are derived from the one master signal. The digital ramp signal is then achieved by computer control which selects and combines relatively short sections of digital signals of successively greater or successively lower frequencies. Thus, the computer may select an appropriate series of divide circuit outputs to collectively provide a digital ramp. Such a digital ramp is a series of pulses of which small groups of successive pulses have successively increasing or successively decreasing repetition rates or frequencies. The size of the individual groups may be made as small as desired to achieve requisite precision of smoothly varying frequency that is to be provided from the controller inverters. Where such a digital ramp is employed, it will replace the analog conditioning circuits 84, together with the analog inputs thereto, and the analog-to-digital converter 83 (all shown in FIG. 6). The circuits 83, 84 of FIG. 6 actually achieve such a digital ramp, but do so under command of selected analog inputs, instead of the alternatively described digital techniques.

POSITION SENSING VARIATION

Employing an overall controlling computer, the previously described reed switches that are provided in and about the station for sensing train position may be eliminated. The increased accuracy of position sensing afforded by such reed switches may be achieved by a computer acting with the existing proximity switches. Absolute and relative train velocity and relative position of two successive trains may be computed by means of information fed to the computer, representing actuation of the several proximity switches by the several trains. Thus, not only may the function of the reed switches in and about the station be taken over by computer control, but this precision sensing would then be available throughout the length of the track wherever the proximity switches exist.

ACCELERATION/DECELERATION CYCLING

In certain operating conditions, an acceleration or deceleration ramp may be relatively long, providing for a large magnitude of speed change. Further, regardless of the length and time of acceleration or deceleration, the desired headway between successive but unconnected vehicles may be less than the time required for a given speed change. Under one or both of these conditions or for other reasons, it may be necessary to operate two or more successive but independent vehicles within an acceleration or deceleration zone at the same time. To achieve this end, it is possible to employ interdigitated modules in conjunction with a second acceleration or deceleration controller, together with suitable inhibit logic. Alternately, and as a more economically feasible approach, a group, such as two, three, four or more, of variable-speed (acceleration or deceleration) controllers may be each connected to every thruster module within the acceleration (or deceleration) zone. Each such module is provided with a set of switches that can alternatively select one of the group of controller signals that are supplied thereto. Thus, each module stator can be energized in succession with variable-speed signals from successive ones of a group of variable-speed controllers. In this arrangement, there is one such variable-speed controller for each independent vehicle in the acceleration-deceleration zone at any given instant. The computer controls selection of one or the other of the variable-speed controllers by the switches in each of the acceleration-deceleration thruster modules. Thus, successive modules will be connected to a first controller as a given vehicle progresses through the acceleration-deceleration zone and such modules are turned off after the vehicle passes. Each module is under computer control to the second of the variable-speed controllers as the next vehicle arrives. Each of the several controllers is provided with its own acceleration or deceleration frequency ramp which is employed to control the several thrusters one at a time as the vehicle progresses through the zone. With such an arrangement, the accelerating or decelerating vehicle can be controlled with a relatively small headway during acceleration and deceleration.

The above-described connection by the thruster control switches of each module to a selected one of a group of controllers may also be employed in place of the previously described HD switching 64 of FIG. 5 that switches different groups of modules at station entrance and at station exit between cruise controllers and acceleration or deceleration controllers.

MULTIPLEXING

It will be readily appreciated that known multiplexing techniques, such as time sharing, may be employed to minimize the number of individual connecting lines between a centralized control and the several thruster modules. The several signals may be coded to enable separate identification of different signals to or from the different modules, or all may be scanned in sequence in a given multiplexor cycle. For example, a group of wires may be routed along the track and connected as required to each module, with each wire assigned a code number or function. With appropriate decoding, a unique group of wires could be connected to each module, particularly identifying that module. Signals sent to or from such module are sent over that particularly identified unique group of lines. Other variations of time sharing and other multiplexing arrangements may be employed.

COMPUTER CONTROL

It will be understood that the use of an overall computer control may greatly facilitate many additional functions, of which some are now to be briefly mentioned. Monitoring actuation of proximity switches will enable identification of a stalled or slowed train by the absence of one such switch actuation at a time predetermined according to train and position and velocity. Individual trains may be monitored and tracked without the use of the above-described magnetic flag so as to remove a vehicle as desired. With complete computer control of the thruster modules, automatic random starts may be achieved to ensure positioning of the vehicles to enable a proper start. So too, vehicles can be selectively moved under computer control of inhibit and actuation of selected modules. Complete system status monitoring by the computer enables automatic adjustment of station speed, cruise speed, acceleration and other system parameters to avoid unsafe conditions, bunching of vehicles at the station due to incompatible station speed and the like. This will help to avoid conditions that might otherwise cause a shutdown. Automatic merging of an additional car entering the track for proper positioning and headway may also be achieved by remote computer control.

The foregoing detailed description is to be clearly understood as given by way of illustration and example only, the spirit and scope of this invention being limited solely by the appended claims.

I claim:

1. A tracked vehicle propulsion system comprising:

a track,
a vehicle,
a series of linear synchronous motors comprising a series of discrete thrusters fixed to the track in mutually spaced relation,
each thruster including a stator and field coil of its corresponding linear synchronous motor, all of said thrusters having at least one rotor common to all of them,
   said rotor comprising a plurality of mutually spaced opposite and interdigitated magnetic poles fixed to said vehicle to be carried thereby along said track in proximity to said series of thrusters,
a plurality of controllers, each individual to a different group
of said thrusters, a first one of said controllers comprising: means for energizing the stators of a first group of thrusters with a first alternating electrical signal of a first frequency whereby the rotor attached to said vehicle will traverse said first group of thrusters at a first velocity determined by said first frequency,
a second one of said controllers comprising: means for energizing the stators of a second group of said thrusters with a second alternating electrical signal of a second frequency whereby said rotor and the vehicle attached thereto will be propelled along the thrusters of said second group at a second velocity in accordance with said second frequency.

2. The vehicle propulsion system of claim 1 wherein said second group of thrusters comprises a plurality of subgroups of thrusters and further including means for selectively energizing stators of individual ones of said subgroups with either said signal of first frequency or said signal of second frequency whereby said rotor and the vehicle attached thereto may be propelled along thrusters of said subgroups at either of said velocities.

3. The apparatus of claim 1 wherein each of said thrusters includes a thruster control, each said thruster control comprising proximity sensing means for generating a proximity electrical signal in response to the presence of a rotor within a selected range of said sensor, a stator phase switch, means responsive to said proximity signal for actuating said stator phase switch, and output means for presenting said proximity signal for control of circuits external to said thruster control.

4. The system of claim 1 including velocity changing means comprising a third group of linear synchronous motor thrusters fixed to said track in mutually spaced relation, each comprising a stator and field coil, at least some of said third group of thrusters being interposed between first and second group of thrusters, a third controller for said third group of thrusters comprising comprising means for providing a third AC electrical signal to the stators of said third group of thrusters, and means for causing the frequency of said third AC electrical signal from said third controller to sweep between said first and second frequencies of said first and second controllers whereby said rotor and vehicle attached thereto may be propelled by the thrusters of said third group at a third velocity that varies from one of said first and second velocities to the other.

5. The system of claim 4 wherein said signals of like frequencies are in phase synchronism with each other.

6. The system of claim 4 including means for synchronizing the phase and frequency of said third AC signal with the phase and frequency of said first signal from said first controller and thereafter synchronizing the phase and frequency of said third AC electrical signal with the phase and frequency of said second signal from said second controller.

7. The system of claim 6 including means for achieving said first mentioned synchronization of said first and third signals before said rotor and vehicle are driven by thrusters of said third group and means for maintaining said synchronization of said second and third controller signals until said rotor and vehicle have passed beyond the thrusters of said third group.

8. The apparatus of claim 4 wherein said third group of linear synchronous motor thrusters comprises a plurality of consecutive subgroups of thrusters and further including switching means for alternatively energizing selected subgroups of said third groups of thrusters from either said first controller or said third controller whereby one or more of said subgroups of thrusters of said third group may be provided with a signal of frequency that causes the rotor and vehicle attached thereto to be propelled thereby at either said first velocity or at said third velocity that varies from one of said first and second velocities to the other, in accordance with the selection afforded by said switching means.

9. The method of driving a linear synchronous motor at a varying velocity, said linear synchronous motor comprising a plurality of mutually spaced field and stator assemblies and a rotor adapted for motion relative to said field and stator assemblies, said method comprising the steps of
   driving the stator of a first one of said assemblies with a first AC electrical signal of a first frequency,
   driving the stator of a second one of said field and stator assemblies with a second AC electrical signal of a second frequency, and
   driving the stator of a third one of said field and stator assemblies that is interposed between said first and second assemblies with a third AC electrical signal that sweeps in frequency between said first and second frequencies.

10. The method of claim 9 including the steps of initiating a sweep of the frequency of said third electrical signal from said first frequency to said second frequency in response to arrival of said rotor in proximity to said third field and stator assembly from a position proximate to said first field and stator assembly.

11. The method of claim 10 including the step of synchronizing the frequency and phase of said third electrical signal with the frequency and phase of said first electrical signal prior to initiating said sweep of frequency.

12. The method of claim 10 including thee step of synchronizing the phase and frequency of said third electrical signal with the phase and frequency of said second electrical signal at the end of said sweep from said first frequency to said second frequency, and maintaining said synchronization with said second electrical signal until said rotor has moved from said third field and stator assembly.

13. The method of claim 10 including the steps of synchronizing the phase of said third electrical signal with the phase of said first electrical signal at the start of said frequency sweep and synchronizing the phase of said third electrical signal with the phase of said second electrical signal at the end of said frequency sweep.

14. The method of claim 10 including the step of changing the frequency of said third electrical signal from said second frequency back to said first frequency when said rotor moves from said third field and stator assembly.

15. The method of controlling movement of a rotor of a plurality of thrusters that are relatively fixed and mutually spaced along a predetermined path, said rotor being common to all said thrusters and adapted to be propelled along said path by each of said thrusters, one after the other, said method comprising the steps of controlling the thrusters of a first group of said thrusters so as to impart a first velocity to said rotor as it traverses the thrusters of said first group, controlling the thrusters of a second group of thrusters so as to impart a second velocity to said rotor as it traverses the thrusters of said second group, at least some of the thrusters of the said first and second gropus being interdigitated with adjacent thrusters of the other group, and inhibiting interdigitated thrusters of said one group when interdigitated thrusters of said groups are respectively controlled so as to tend to impart different velocities to said rotor.

16. The method of claim 15 wherein said second group of thrusters includes at least one subgroup of thrusters, and including the steps of alternatively controlling said subgroups of thrusters of said second group so as to impart to said rotor as it traverses thrusters of such subgroups either a velocity substantially equal to said second velocity or alternatively, a third velocity different from said second velocity.

17. The method of claim 16 wherein said third velocity is a relatively fixed velocity different than said first velocity, and wherein said second velocity is a velocity that varies between said first and third velocities.

18. The method of claim 16 including the step of selectively controlling thrusters of consecutive subgroups of thrusters of said second group so that said second varying velocity may be imparted to said rotor as it is propelled by all or only some of said subgroups of thrusters.

19. The method of claim 17 including the steps of initially controlling all of said subgroups of thrusters so as to impart said third relatively fixed velocity to said rotor, controlling one or more of said subgroups of thrusters so as to impart to said rotor said second varying velocity, said varying velocity being a decreasing velocity in accordance with the distance between said rotor and a second leading rotor that precedes said first-mentioned rotor and that is propelled by thrusters ahead of said first-mentioned rotor, more of said subgroups of thrusters being controlled to impart said decreasing second velocity to said first-mentioned rotor when the distance between said rotors is relatively small, and fewer of said subgroups of thrusters being controlled to impart said decreasing second velocity to said first-mentioned rotor when the distance between said rotors is relatively large.

20. The method of claim 15 wherein said step of controlling thrusters of said second group comprises the energization of said thrusters so as to propel said rotor along said path with a velocity that varies in a sense to approach the magnitude of said first velocity.

21. The method of claim 15 wherein said step of controlling the interdigitated thrusters of said second group comprises the step of energizing said interdigitated thrusters of said second group so as to cause said second velocity to change with respect to said first velocity, whereby said rotor may be propelled at either a fixed speed, or at a changing speed when it is within a section of said path that contains said interdigitated thrusters of said first and second groups.

22. The method of claim 15 wherein said thrusters include a third group of thrusters, some of which are interdigitated with thrusters of said first group, and including the steps of controlling said interdigitated thrusters of said third group so as to cause said rotor to be propelled along said path by said interdigitated thrusters of said third group with either steady, or alternatively, with increasing velocity, selectively inhibiting either the thrusters of said first group that are interdigitated with thrusters of said third group, or the thrusters of said third group that are interdigitated with thrusters of said first group.

23. The method of claim 22 comprising the steps of operating said interdigitated thrusters in one or more of the following modes:

a. energizing and controlling interdigitated thrusters of said second group so as to decelerate said rotor as it approaches thrusters of said first group from a position along said path adjacent thrusters of said second group and inhibiting thrusters of said first group that are interdigitated with thrusters of said second group, b. inhibiting thrusters of said second group that are interdigitated with thrusters of said first group and concurrently energizing thrusters of the first group that are interdigitated with thrusters of the second group when said rotor is within a section of said path in which said interdigitated thrusters of said first and second groups are located, c. energizing interdigitated thrusters of both said first and third groups so as to propel said rotor at said first velocity when said rotor is within the influence of both said first and third groups, d. inhibiting thrusters of said third group and energizing thrusters of said first group when said rotor is at a section of said path in which said interdigitated first and third group of thrusters are located, e. inhibiting thrusters of said first group that are interdigitated with thrusters of the third group and concurrently energizing thrusters of said third group when the rotor is at a section of the path at which said interdigitated first and third group of thrusters are positioned so that the rotor may be accelerated from a point along said path from a position wherein it is adjacent said first group of thrusters.

24. The method of claim 23 including the step of accelerating said rotor from said first group of thrusters at a section of said path where said first group of thrusters are interdigitated with said third group of thrusters and when said thrusters of said first group of thrusters are inhibited, said last-mentioned step comprising releasing the inhibit of thrusters of said first group of thrusters one at a time as the rotor leaves such thruster.

25. The method of controlling the movement of a rotor of a synchronous motor of a type wherein a plurality of thrusters are relatively fixed and mutually spaced along a predetermined path, said rotor being common to all of said thrusters and adapted to be propelled along said path by each of said thrusters one after the other, said method comprising the steps of energizing the thrusters with a fixed frequency drive signal so as to impart a first relatively fixed velocity to said rotor as it traverses said thrusters, and alternatively energizing said thrusters with a varying frequency drive signal so as to impart to said rotor as it traverses said thrusters a second velocity that varies from said first velocity to a third relatively fixed velocity.

26. A tracked vehicle propulsion system comprising:

a track, a vehicle, a series of thrusters affixed to the track in mutually spaced relation, all of said thrusters having at least one rotor common to all, said thrusters comprising:

a first group of cruise thrusters, a second group of cruise deceleration thrusters, and a third group of low-speed thrusters, said groups being arranged consecutively along said track so that said rotor will be propelled in order by said first group, said second group and said third group, a cruise controller for energizing said first group of thrusters to propel said rotor at a first relatively fixed cruise velocity, a deceleration controller for generating a thruster energizing signal connected to cause thrusters energized thereby to propel said rotor at a decreasing velocity, a third low-speed controller for generating a thruster energizing signal for energizing said low-speed thrusters of said third group to propel said rotor at said low relatively fixed velocity, and switching means for alternatively energizing at least some of the cruise deceleration thrusters of said second group from either said cruise controller or from said deceleration controller so as to cause such cruise deceleration thrusters of said second group to propel the rotor at either said relatively fixed cruise velocity or at said decreasing velocity.

27. The apparatus of claim 26 including a fourth group of deceleration thrusters interposed between said second group of cruise deceleration thrusters and said third group of low-speed cruise thrusters, and means for energizing said fourth group of deceleration thrusters with the thruster energizing signal generated by said deceleration controller.

28. The apparatus of claim 27 wherein at least some of the thrusters of said third group are interdigitated with at least some of the thrusters of said fourth group, and means for selectively inhibiting interdigitated thrusters of said third or fourth groups so that a rotor within the influence of interdigitated thrusters of said third and fourth groups may be propelled by thrusters of either said third group or said fourth group.

29. The apparatus of claim 26 including a second rotor adapted to be propelled along said track by said groups of thrusters in spaced relation to said first mentioned rotor, means for sensing the spacing of a following one of said rotors from the other of said rotors, means responsive to said sensing means for operating said switching means so as to cause said cruise deceleration thrusters to be energized by said deceleration controller, second sensing means for detecting when said following rotor is positioned at said third group of thrusters, and means responsive to said second sensing means for operating said switching means so as to cause said cruise deceleration thrusters to be energized by said cruise controller.

30. The apparatus of claim 29 wherein at least some of said thrusters include a thruster control, each said thruster control comprising proximity sensing means for generating a proximity electrical signal in response to the presence of a train within a selected range of said proximity sensing means, a plurality of stator phase switches, means responsive to said proximity signal for actuating said stator phase switch, and output means for presenting said proximity signal for control of circuits external to said thruster control, said second sensing means comprising one of said proximity sensing means.

31. The system of claim 29 wherein said cruise deceleration thrusters comprise a plurality of subgroups of thrusters, wherein said switching means includes a plurality of switches respectively individual to a different one of said subgroups, wherein said means for operating said switching means includes means for selectively operating one or more of said switches, more of said subgroups of cruise deceleration thrusters being switched to be energized by said deceleration controller when the sensed spacing between said rotors is relatively small and fewer of said cruise deceleration thrusters being switched to be energized by said deceleration controller when greater spacing between said rotors is sensed.

32. The apparatus of claim 31 including means for triggering said switching means to cause said second group of thrusters to be energized by said deceleration controller upon the occurrence of a predetermined spacing between first and second rotors as signalled by said first-mentioned sensing means, or, in the alternative, by a predetermined position of said first-mentioned rotor alone when said second rotor is not closer to said first rotor than in a predetermined minimum distance.

33. The system of claim 31 wherein said means for selectively operating said switches comprises means for generating a signal $R_s$ when a predetermined spacing between said rotors occurs, means for generating a plurality of position signals, each representing progress of said rotor to a unique one of selected thrusters of said second group of thrusters, and means responsive to coincidence of said signal $R_s$ and one of said position signals for operating said switches to selectively connect one or more of said subgroups of thrusters of said second group for energization by said second deceleration controller.

34. The apparatus of claim 33 wherein at least some of said thrusters include a thruster control, each said thruster control including means for generating said position signals comprising proximity sensing means for generating one of said position signals in response to the presence of a train within a selected range of said sensing means, a plurality of stator phase switches, means responsive to said position signal of said proximity sensing means for actuating said stator phase switch, and output means for presenting said position signal for control of circuits external to said thruster control.

35. The system of claim 29 wherein said thrusters of said second group of cruise deceleration thrusters are interdigitated with thrusters of said third group of low-speed thrusters and including means for inhibiting interdigitated thrusters of one of said second or third groups when the interdigitated thrusters of the other of said second or third groups are energized and propelling said rotor.

36. The system of claim 35 wherein said thrusters comprise stator and field assemblies of linear synchronous motors, wherein each of said cruise and low-speed controllers energize respective groups of thrusters with an AC stator drive signal of first and second relatively fixed frequencies, respectively, and wherein said deceleration controller energizes respective thrusters with an AC stator drive signal of a third frequency that sweeps from said first frequency to said second frequency.

37. The system of claim 36 wherein signals of like frequencies are in phase synchronism with each other.

38. The system of claim 37 wherein said means for inhibiting a given interdigitated thruster of said third group comprises means responsive to progress of a rotor to an interdigitated thruster of said second group that is located on either side of such given thruster of said third group.

39. The apparatus of claim 37 including means for sensing when the velocity imparted by thrusters of said second thruster group is equal to the velocity imparted by thrusters of said third low-speed cruise group, and means responsive to said sensing means for removing the inhibit on the interdigitated thrusters of said third group.

40. The apparatus of claim 39 wherein said means for sensing when velocities are equal comprises means responsive to synchronization of said third frequency to said second frequency.

41. The apparatus of claim 40 including means for inhibiting interdigitated thrusters of said second group at the end of a delay interval that begins with the removal of the inhibit of interdigitated thrusters of said third group.

42. A tracked vehicle propulsion system comprising:

a track,
a vehicle,
a series of motors comprising a series of discrete thrusters fixed to the track in mutually spaced relation, said thrusters having at least one rotor common to all of them, said thrusters comprising:
a first group of cruise thrusters,
a second group of acceleration thrusters, at least some of said acceleration thrusters being interdigitated with said cruise thrusters,
a cruise controller for energizing said cruise thrusters to propel said rotor and vehicle at a relatively fixed cruise velocity,
an acceleration controller for energizing said acceleration thrusters so as to cause said rotor and vehicle attached thereto to be propelled by said acceleration thrusters at either said cruise velocity, or at a second higher cruise velocity, or at a third velocity that increases from said first to said second velocity, and means for selectively inhibiting interdigitated thrusters of one of said groups of acceleration and cruise thrusters when the rotor and vehicle attached thereto are being propelled by the interdigitated modules of the other of said groups.

43. The apparatus of claim 42 wherein said cruise thrusters are station thrusters wherein said cruise controller is a station controller and wherein said fixed cruise velocity is a station velocity, and including means for inhibiting interdigitated thrusters of said group of station thrusters when the rotor and vehicle attached thereto are being propelled at increasing velocity by said interdigitated acceleration thrusters and concomitantly are within the influence of said interdigitated group of station thrusters.

44. The vehicle propulsion system of claim 43 including means for releasing the inhibit of respective ones of said interdigitated thrusters of said group of station thrusters when said rotor and vehicle attached thereto have progressed beyond such station thruster to be released.

45. The propulsion system of claim 44 wherein the inhibit of the interdigitated thrusters of said group of station thrusters is released for one of said station thrusters at a time as said rotor and vehicle progress beyond the individual thruster to be released.

46. The apparatus of claim 45 including means for controlling the interdigitated thrusters of said group of acceleration thrusters to cause said rotor and vehicle attached thereto to be propelled at an increasing velocity from a predetermined point along said track.

47. The apparatus of claim 46 including a second rotor and vehicle attached thereto, means responsive to the presence of said second rotor and vehicle ahead of said first-mentioned rotor and vehicle to be accelerated for enabling the initiation of acceleration of said train by said acceleration thrusters of said second group when the second-mentioned rotor and vehicle have progressed beyond the influence of said group of acceleration thrusters.

48. A tracked vehicle propulsion system comprising:

a track,
a vehicle,
a series of discrete thrusters fixed to the track in mutually spaced relation, each thruster comprising a stator and field assembly of a linear synchronous motor, all of said thrusters having at least one rotor common to all of them, said thrusters comprising:

a first group of station thrusters, and
a second group of acceleration thrusters, at least some of said acceleration thrusters being interdigitated with some of said station thrusters,
a station controller for energizing said station thrusters with a station electrical signal having a frequency that causes said station thrusters to drive a rotor within their influence at a station speed,
an acceleration controller for energizing said acceleration thrusters with a first low-speed signal having a frequency that causes said acleration thrusters to propel the rotor at a station speed, for energizing said acceleration thrusters with a second signal having a frequency that causes said acceleration thrusters to propel the rotor at a relatively high cruise speed, and for energizing the acceleration thrusters with a third signal having a frequency that sweeps between the frequencies of said first and second acceleration controller signals so as to cause said acceleration thrusters to propel the rotor at an increasing speed,
means for synchronizing the phase and frequency of said station electrical signal with the phase and frequency of the first signal from said acceleration controller whereby said rotor may be propelled at low station speed by said interdigitated station or acceleration thrusters, means for inhibiting said acceleration thrusters, means responsive to a preselected first position of said rotor for releasing the inhibit of said acceleration thrusters, means responsive to a predetermined second position of said rotor subsequent to said first position for inhibiting station thrusters that are interdigitated with said acceleration thrusters, means responsive to a predetermined third position of said rotor subsequent to said second position for initiating said third acceleration controller electrical signal of increasing frequency, means for releasing the inhibit of said station thrusters when said rotor reaches predetermined positions further down said track, means for causing said acceleration controller to energize said acceleration thrusters with said second higher fixed frequency signal, means responsive to a fourth position of said rotor beyond the influence of said acceleration thrusters for causing said acceleration controller to energize said acceleration thrusters with said first signal of lower frequency, and means for synchronizing said station controller electrical signal in phase and frequency with said first acceleration controller electrical signal.

49. The apparatus of claim 48 wherein at least some of said thrusters include a thruster control, each said thruster control comprising proximity sensing means for generating an electrical proximity signal in response to the presence of a train within a selected range of said sensor, a plurality of stator phase switches, means responsive to said proximity signal for actuating said stator phase switch, and output means for presenting said proximity signal for control of circuits external to said thruster control, at least some of said means responsive to rotor position comprising means connected to be actuated by a proximity signal from a predetermined one of said thrusters.

50. A linear synchronous motor drive system comprising:

a track, a plurality of thrusters mutually spaced along said track, each said thruster comprising a field and a stator, means for generating said stators with AC stator drive signals of like frequency and predetermined relative phase for all of said stators, and a rotor mounted to be propelled along said track by one after the other of said thrusters, said rotor comprising a plurality of oppositely poled magnetic poles mutually spaced in the direction of motion of said rotor by a predetermined pole pitch, the stators of said thrusters being mutually spaced by a distance such that a magnetic wave traveling along any one of a group of said stators will have substantially the same phase relation relative to said rotor poles when the rotor is propelled along said track at the velocity of said traveling magnetic wave by any one or more of the stators of said group.

51. The apparatus of claim 50 wherein said rotor comprises a plurality of mutually spaced rotors connected in a train of rotors, each rotor of the train having a plurality of oppositely poled magnetic poles mutually spaced in the direction of propulsion of said rotors by an integral multiple of said pole pitch, said rotors of said train of rotors being fixedly spaced from one another so that the magnetic pole pieces of any one of the rotors are spaced from magnetic pole pieces of another of said rotors by an integral multiple of said pole pitch.

52. A linear synchronous motor system comprising:

a thruster having a field and a stator, means for energizing the stator with AC electrical drive signal of a predetermined phase and frequency to thereby produce a magnetic wave that travels along said stator at a velocity determined by said frequency, and a plurality of rotors adapted to be propelled by and along said stator, said rotors being fixedly connected to each other and mutually spaced from each other along the direction of travel of traveling magnetic wave, said rotors comprising:

a plurality of oppositely oriented and oppositely poled magnetic poles mutually spaced from each other by pole pitch distance along the direction of travel of said magnetic wave, poles of one of said rotors being spaced from poles of another of said rotors by an integral multiple of said pole pitch whereby, as said interconnected rotors are propelled by said stator at the velocity of said traveling magnetic wave, all of said poles of said rotors will maintain substantially the same phase angle with respect to said traveling magnetic wave.

53. The apparatus of claim 52 including a plurality of thrusters, each substantially identical to said first-mentioned thruster and each comprising a field and stator coil, each of said plurality of thrusters being spaced from an adjacent thruster in the direction of travel of said magnetic wave and by a distance sufficient to retain a substantially unvarying phase angle between the traveling magnetic wave of each of said thrusters and any one or more of the rotors of said train of rotors that is being propelled thereby, and means for energizing a group of said thrusters with an AC electrical stator drive signal of the same phase and frequency.

54. A synchronous motor propulsion system comprising:

a plurality of synchronous thrusters mutually spaced from each other along a path adapted to be traversed by a rotor that is propelled by said thrusters one after the other, each said thruster comprising a field and a stator, a rotor mounted to be propelled along said thrusters, said thrusters comprising first and second groups of thrusters in first and second adjacent zones of said path, respectively, each said group having at least one thruster therein, means for driving the thrusters of a first one of said groups that is to the rear of the other of said groups with a first stator drive signal of a predetermined frequency, means for driving the thrusters of the other of said groups of thrusters with a second stator drive signal of a varying frequency, whereby a rotor propelled by said first group of thrusters will be propelled at a first velocity determined by said first fixed frequency, and whereby said rotor, when propelled by said second group of thrusters, will be propelled at a velocity that varies as said second frequency varies.

55. The system of claim 54 including means for synchronizing phase and frequency of said stator drive signal of said second group of thrusters with the phase and frequency of said stator drive signal of said first group of thrusters, and means for releasing said synchronization to allow said second frequency to vary when said rotor is substantially out of the influence of thrusters of said first group, whereby said rotor will maintain said first velocity as it is propelled by thrusters of said first group and as it is propelled in transition between said first and second groups, and whereby said rotor may be propelled with a varying velocity when it is propelled substantially entirely by thrusters of said second group.

56. The system of claim 54 wherein said rotor comprises a train of mutually spaced and fixedly interconnected rotors, said rotors being mutually spaced from one another so as to all experience the same phase angle with respect to a traveling magnetic wave produced by said stators and said stator drive signals, and including means for initiating said varying frequency of said stator drive signals of said second group of stators, said initiating means comprising means for sensing arrival of the rearmost rotor of said train of rotors into said second zone of thrusters, and means responsive to said sensing means for initiating said frequency change of said second stator drive signal.

57. The system of claim 56 wherein at least some of said thrusters include a thruster control for generating a proximity signal when a rotor is within a predetermined distance of the individual thruster, said sensing means including the thruster control of a thruster within said second zone.

58. A tracked vehicle propulsion system comprising:

a track,
a plurality of linear synchronous motors, each comprising:
  a thruster having a field and stator, said thrusters being fixed to said track at mutually spaced intervals,
  at least one rotor common to all of said thrusters and mounted to be propelled along said track by one after the other of said thrusters,
means for changing velocity of said rotor comprising:

means for generating a stator drive signal having a frequency ramp that varies from a first frequency corresponding to a first velocity of said rotor to a second frequency corresponding to a second velocity of said rotor,
  means for energizing said stators with said stator drive signal whereby the rotor of said linear synchronous motors will be driven at a velocity that varies in accordance with the variation of frequency of said stator drive signal,
  means responsive to arrival of said rotor at a first point along said track for initiating said frequency ramp,
  means responsive to arrival of said rotor at a second point along said track for terminating said frequency ramp and driving said stators with a signal having said second frequency, and
  said first and second frequencies of said stator drive signals being in phase with stator drive signals corresponding to said first and second velocities, respectively.

59. A linear synchronous motor propulsion system comprising:
a track having at least a plurality of sections,
a vehicle mounted for movement along said track, linear synchronous motor propulsion means having rotor and stator elements of which one is mounted on said vehicle and the other is mounted on said track, and
means for energizing said stator element to propel said vehicle along said track at different velocities, said means for energizing comprising:
  means for feeding the stator element of said linear synchronous motor means with stator drive signal of different frequencies at different sections of said track, whereby a stator drive signal of a first frequency will propel the vehicle at one section of track with a first velocity controlled by said first frequency, and a stator drive signal of a second frequency will propel the vehicle at another section of track with a second velocity controlled by said second frequency.

60. The system of claim 59 wherein said motor means comprises a rotor fixed to said vehicle and a plurality of mutually spaced stator elements fixed to said track, said stator drive signal of first frequency being fed to stator elements fixed to said one track section and said stator drive signal of said second frequency being fed to stator elements fixed to said other section of track.

61. The system of claim 59 wherein said motor means comprises a rotor fixed to said track and a stator fixed to said vehicle, said track including means for transferring stator drive signals to a vehicle carried stator, said stator drive signal of said first frequency being fed to said one section of track for transfer to a stator of said vehicle at said one section, and said stator drive signal of said second frequency being fed to said other section of track for transfer to the stator of said vehicle at said other section.

* * * * *